US010046970B2

(12) United States Patent
Ding et al.

(10) Patent No.: US 10,046,970 B2
(45) Date of Patent: Aug. 14, 2018

(54) PROCESS FOR PURIFYING SEMICONDUCTING SINGLE-WALLED CARBON NANOTUBES

(71) Applicant: National Research Council of Canada, Ottawa (CA)

(72) Inventors: Jianfu Ding, Ottawa (CA); Patrick Malenfant, Ottawa (CA); Zhao Li, Orleans (CA); Jacques Lefebvre, Gatineau (CA); Fuyong Cheng, Ottawa (CA); Benoit Simard, Ottawa (CA)

(*) Notice: Subject to any disclaimer, the term of this patent is extended or adjusted under 35 U.S.C. 154(b) by 237 days.

(21) Appl. No.: 14/912,645

(22) PCT Filed: Aug. 18, 2014

(86) PCT No.: PCT/CA2014/050788
§ 371 (c)(1),
(2) Date: Feb. 18, 2016

(87) PCT Pub. No.: WO2015/024115
PCT Pub. Date: Feb. 26, 2015

(65) Prior Publication Data
US 2016/0200578 A1 Jul. 14, 2016

Related U.S. Application Data

(60) Provisional application No. 61/867,630, filed on Aug. 20, 2013.

(51) Int. Cl.
*B01D 11/02* (2006.01)
*B01D 21/26* (2006.01)
(Continued)

(52) U.S. Cl.
CPC ...... *C01B 31/0266* (2013.01); *B01D 11/0257* (2013.01); *B01D 11/0265* (2013.01);
(Continued)

(58) Field of Classification Search
CPC . B01D 11/02; B01D 11/0257; B01D 11/0265; B01D 11/028; B01D 11/0284;
(Continued)

(56) References Cited

U.S. PATENT DOCUMENTS 7,226,818 B2   6/2007   Malenfant et al.
7,247,670 B2   7/2007   Malenfant et al.
(Continued)

FOREIGN PATENT DOCUMENTS

CN   101462713 A   6/2009
JP   2007031238 A   2/2007
WO   2012017822 A1  2/2012

OTHER PUBLICATIONS

Berton et al., "Chemistry of Materials—Copolymer-Controlled Diamerter-Selective Dispersion of Semiconducting Single-Walled Carbon Nanotubes", 2011. vol. 23, pp. 2237-2249. ACS Publications.

(Continued)

*Primary Examiner* — Joseph Drodge
(74) *Attorney, Agent, or Firm* — Brunet & Co. Ltd.; Robert A. H. Brunet; Hans Koenig

(57) ABSTRACT

A two-step sc-SWCNT enrichment process involves a first step based on selective dispersion and extraction of semiconducting SWCNT using conjugated polymer followed by a second step based on an adsorptive process in which the product of the first step is exposed to an inorganic absorptive medium to selectively bind predominantly metallic SWCNTs such that what remains dispersed in solution is further enriched in semiconducting SWCNTs. The process is easily scalable for large-diameter semi-conducting single-walled carbon nanotube (sc-SWCNT) enrichment with average diameters in a range, for example, of about 0.6 to 2.2 nm. The first step produces an enriched sc-SWCNT dispersion with a moderated sc-purity (98%) at a high yield, or a (Continued)

high purity (99% and up) at a low yield. The second step can not only enhance the purity of the polymer enriched sc-SWCNTs with a moderate purity, but also further promote the highly purified sample to an ultra-pure level. Therefore, this two-step hybrid process provides sc-SWCNT materials with a super high purity, as well as both a high sc-purity (for example greater than 99%) and a high yield (up to about 20% or higher).

20 Claims, 16 Drawing Sheets

(51) Int. Cl.
    *C01B 32/16*     (2017.01)
    *C01B 32/17*     (2017.01)
    *C01B 31/02*     (2006.01)
    *B82Y 30/00*     (2011.01)
    *C01B 32/174*     (2017.01)
    *C01B 32/159*     (2017.01)
    *C01B 32/172*     (2017.01)
    *C01B 32/166*     (2017.01)
    *B82Y 40/00*     (2011.01)
(52) U.S. Cl.
    CPC ........ *B01D 11/0288* (2013.01); *B01D 21/262* (2013.01); *B82Y 30/00* (2013.01); *C01B 32/159* (2017.08); *C01B 32/166* (2017.08); *C01B 32/172* (2017.08); *C01B 32/174* (2017.08); *B82Y 40/00* (2013.01)
(58) Field of Classification Search
    CPC .... B01D 11/0288; B01D 15/00; B01D 15/02; B01D 21/26; B01D 21/262; B01D 37/00; C01B 32/05; C01B 32/15; C01B 32/152; C01B 32/154; C01B 32/156; C01B 32/158; C01B 32/159; C01B 32/16; C01B 32/164; C01B 32/166; C01B 32/168; C01B 32/17; C01B 32/172; C01B 32/174; C01B 2202/02; C01B 2202/22; C01B 2202/36
    USPC ........ 210/634, 638, 639, 660; 423/460, 461, 423/445 B; 977/734, 735, 737, 738, 740, 977/745, 750, 751, 845, 847, 848
    See application file for complete search history.

(56) References Cited

U.S. PATENT DOCUMENTS

| | | | |
|---|---|---|---|
| 7,374,685 B2 | 5/2008 | Sun | |
| 7,514,063 B1 | 4/2009 | Tulevski et al. | |
| 8,231,854 B2 | 7/2012 | Kajiura et al. | |
| 2004/0232073 A1* | 11/2004 | Papadimitrakopoulos | B82Y 30/00 210/634 |
| 2006/0081882 A1* | 4/2006 | Malenfant | B82Y 10/00 257/203 |
| 2009/0285746 A1* | 11/2009 | Kajiura | B82Y 30/00 423/447.2 |
| 2010/0111814 A1 | 5/2010 | Doom et al. | |
| 2010/0166637 A1* | 7/2010 | Ziegler | B01D 11/0492 423/447.1 |
| 2010/0278714 A1 | 11/2010 | Tanaka et al. | |
| 2011/0280791 A1 | 11/2011 | Tanaka et al. | |
| 2012/0104328 A1 | 5/2012 | Park et al. | |
| 2012/0286215 A1 | 11/2012 | Rao et al. | |
| 2013/0052120 A1 | 2/2013 | Liu et al. | |

OTHER PUBLICATIONS

Gao et al. "Carbon—Effectiveness of sorting single-walled carbon nanotubes by diameter using polyfluorene derivatives", Jan. 2011. vol. 49, Issue 1, pp. 333-338. Science Direct.
Gao et al. "Tuning the physical parameters towards optimal polymer-wrapped single-walled carbon nanotubes dispersion", Feb. 9, 2012. The European Physical Journal B.
Mark Hersam Progress towards monodisperse single-walled carbon nanotubes, Jul. 2008. vol. 3, pp. 387-394. Macmillan Publishers Limited.
Hwang et al "Ploymer Structure and Solvent Effects on the Selective Dispersion of Single-Walled Carbon Nanotubes," Oct. 9, 2007. Chapter 130, pp. 3543-3553. American Chemical Society.
Lemasson et al. "Polymer Library Comprising Florene and Carbazole Homo—and Copolymers for Selective Single-Walled Carbon Nanotubes Extraction", 2011. pp. 713-722. ACS Publications.
Ozawa et al. "Rational Concept to Recognize/Extract Single-Walled Carbon Nanotubes with Specific Chirality"Journal of the American Chemical Society, 2011. Chapter 133, pp. 2651-2657. ACS Publications.
Tange et al. "Selective Extraction of Large-Diameter Single-Wall Carbon Nanotubes with Specific Chiral Indices by Poly(9,9-dioctylfluorene-alt-benzothiadiazole)", Journal of the American Chemical Society, 2011. Chapter 133, pp. 11908-11911. ACS Publications.
Nish et al., "Highly selective dispersion of single-walled carbon nanotubes using aromatic polymers", nature nanotechnology, vol. 2, Oct. 2007, pp. 640-646.
International Search Report and Written Opinion for PCT/CA2014/050788, dated Oct. 17, 2014.
Office Action on CN 201480055827.0 dated Oct. 10, 2017.
Berton N, et al. Chem. Mater. 2011, 23, 2237-2249.
Office Action dated Dec. 1, 2016 on Chinese Patent Application 201480055827.0.
Adrian Nish et al., "Highly selective dispersion of single-walled carbon nanotubes using aromatic polymers", Nature Nanotechnology, vol. 2, pp. 640-646, Oct. 2007.
Mark C. Hersam, Nature Nanotechnology, vol. 3, pp. 378-394, Jul. 2008.
Bisri et al. "High Performance Ambipolar Field-Effect Transistor of Random Network Carbon Nanotubes", Adv. Mater. 2012, 24, 6147-6152.
Ding J, et al. "Synthesis and Characterization of Alternating Copolymers of Fluorene and Oxadiazole." Macromolecules, 2002, 35, 3474-3483.
Gormulya W, et al. "Semiconducting Single-Walled Carbon Nanotubes on Demand by Polymer Wrapping." Adv. Mater. 2013, 25, 2948-2956.
Itkis ME, et al. "Purity Evaluation of As-Prepared Single-Walled Carbon Nanotube Soot by Use of Solution-Phase Near-IR Spectroscopy." Nano Letters, 2003, vol. 3, No. 3, 309-314.
Mistry KS, et al. "High-Yield Dispersions of Large-Diameter Semiconducting Single-Walled Carbon Nanotubes with Tunable Narrow Chirality Distributions." ACS Nano. 2013, vol. 7, No. 3, 2231-2239.
Naumov AV, et al. "Analyzing Absorption Backgrounds in Single-Walled Carbon Nanotube Spectra." ACS Nano. 2011, vol. 5, No. 3, 1639-1648.
Extended European Search Report dated Mar. 28, 2017 on European Application 14837608.0.

\* cited by examiner

PROCESS FOR PURIFYING SEMICONDUCTING SINGLE-WALLED CARBON NANOTUBES

CROSS-REFERENCE TO RELATED APPLICATIONS

This application is a national phase entry of International Patent Application PCT/CA2014/050788 filed Aug. 18, 2014 and claims the benefit of U.S. Patent Provisional Patent Application USSN 61/867,630 filed Aug. 20, 2013, the entire contents of both of which are herein incorporated by reference.

FIELD

The present application relates to carbon nanotubes.

BACKGROUND

An important class of carbon nanotubes is single-walled carbon nanotubes (SWCNTs). They are generally produced as ensemble samples containing both metallic and semiconducting nanotubes with a distribution of chiralities centered at a mean diameter. Several methods can be used to produce SWCNTs which will vary in the distribution of chiralities, diameter range, semiconducting/metallic (sc/m) content and average length. For example, HiPco and CoMoCat SWCNTs are relatively smaller in diameter (0.6-1.3 nm), while arc-discharge, laser (laser-ablation) and plasma SWCNTs are relatively larger (1.0-2.2 nm). Though a sc-SWCNT content as high as 95% can be produced with techniques such as CoMoCat, most as-prepared SWCNT samples have less than 70% sc-content. For many applications, such as thin film transistors (TFTs), a sc-purity higher than 99% is needed, therefore scalable methods that enable a commercially viable process need to be developed.

Several methods have been used to demonstrate the effective enrichment and isolation of semiconducting SWCNTs with greater than 99% sc-purity as assessed by absorption spectroscopy. Among these methods are density gradient ultracentrifugation (DGU), gel chromatography (GC), dielectrophoresis and selective extraction by conjugated polymers. Amongst these listed options, chromatography and conjugated polymer extraction may provide a clearer path to scalable enrichment of sc-SWCNTs. Furthermore, the simplicity of the conjugated polymer extraction process, which generally entails a dispersion followed by a centrifugation step, further distinguishes it from the rest as a cost-effective method for the isolation of sc-SWCNTs with greater than 99% semiconducting content.

The first disclosure that conjugated polymers could selectively disperse semiconducting SWCNTs and lead to enriched semiconducting SWCNT fractions of relevance for thin film transistor fabrication can be found in the patent literature (Malenfant 2007). Subsequently, the exceptional selectivity that could be achieved with polyfluorene derivatives towards specific semiconducting SWCNT chiralities was demonstrated. More recently an effective enrichment of HiPco sc-SWCNTs using poly(3-dodecyl thiophene) (P3DDT) and arc-plasma-jet tubes using PFDD was also demonstrated to provide TFTs with mobilities greater than 10 $cm^2$/Vs. Collectively, these results, amongst others, have clearly shown the potential for conjugated polymers in sc-SWCNT enrichment and TFT device fabrication.

To date, many homo- and copolymers of phenylenevinylene, carbazole, thiophene and fluorene have been investigated for enrichment. For example, P3DDT displayed a promising result in the separation of HiPCO nanotubes, however P3DDT is not suitable for the separation of larger diameter SWCNTs, which are more desirable when trying to minimize contact resistance and to obtain a large electron mobility in thin film transistors. Similarly, it has been observed that poly(9,9-dioctylfluorene) (PFO) has a high selectivity in dispersing small-diameter sc-SWCNTs with large chiral angles (20°≤θ≤30°), but not large-diameter SWCNTs, which is believed to be difficult to disperse and to enrich owing to the strong interaction between the nanotubes associated with the low curvature of the nanotube wall. As a result, co-monomer units have been introduced into the polyfluorene main chain in order to target specific tube chiralities/diameters. They include: phenylene-1,4-diyl, thiophen-2,5-diyl, anthracene-9,10-diyl, anthracene-1,5-diyl, naphthalene-1,5-diyl, 2,2-bithiophene-5,5'-diyl, and benzo-2,1,3-thiadiazole-4,7-diyl.

Furthermore, the length of the side alkyl chain of the polymers has a significant impact on the enrichment effectiveness. Polymers with 12-carbon long side chains showed an improved selectivity to sc-SWCNTs with larger diameters. Recently work on the enrichment of large diameter SWCNTs using fluorene homopolymers with long alkyl side chains has been done, which achieved a device performance of 14.3 $cm^2$/Vs and on/off ratio over $10^5$.

Current enrichment methods are limited by a combination of issues such as a lack of scalability (DGU), prohibitive cost (chromatography), the yield/effectiveness and device performance (selective polymer extraction).

There remains a need for commercially viable processes for separating sc-SWCNTs in high yield and high purity from m-SWCNTs.

SUMMARY

A hybrid process of two steps for separating semiconducting single-walled carbon nanotubes (sc-SWCNTs) from metallic single-walled carbon nanotubes (m-SWCNTs) is provided.

Thus, there is provided a process for selectively separating semiconducting single-walled carbon nanotubes (sc-SWCNTs) from metallic single-walled carbon nanotubes (m-SWCNTs), comprising: extracting a mixture of sc-SWCNTs and m-SWCNTs with a conjugated polymer to produce an enriched sc-SWCNT dispersion; and exposing the enriched sc-SWCNT dispersion to an inorganic adsorptive medium in a non-polar solvent, the inorganic adsorptive medium selectively binding the m-SWCNTs to further separate the sc-SWCNTs from the m-SWCNTs.

The mixture of sc-SWCNTs and m-SWCNTs may come from any convenient source of CNT preparation. Such starting material preferably comprises raw (about 0.6 to 2.2 nm average diameter) SWCNTs prepared from HiPco, CoMoCAT, CVD, arc-discharge, laser-ablation or plasma processes. The amount of conjugated polymer used in the extraction in relation to the amount of SWCNTs in the mixture of sc-SWCNTs and m-SWCNTs (i.e. polymer: SWCNT mass ratio) is preferably about 0.5:1 or greater, for example 0.5:1 to 10:1

The conjugated polymer may comprise any suitable polymer that will selectively fractionate sc-SWCNTs from the starting mixture. The polymer may be a homopolymer or copolymer. Some examples of polymers include polyfluorenes, polythiophenes, polyphenylenevinylenes, and their copolymers with one or more co-monomer units (e.g. bithiophene, phenylene, bipyridine, anthracene, naphthalene and benzothiadiazole) or combinations thereof. The conjugated polymer preferably comprises a polyfluorene derivative, for example a 9,9-dialkyl-substituted polyfluorene, or a 9,9-diC$_{10\text{-}36}$-alkyl-substituted polyfluorene, or a 9,9-diC$_{10\text{-}18}$-alkyl-substituted polyfluorene. The alkyl substituent may be linear or branched. The conjugated polymer preferably has a number average molecular weight ($M_n$) greater than about 10,000 Da, for example from about 10,000 Da to about 500,000 Da, preferably from about 10,000 Da to about 30,000 Da. The combination of the π-π interaction between the conjugated polymer and the nanotubes, and the wrapping/coating of the conjugated polymer on the nanotubes affords a high selectivity based on the electronic properties and chiralities of the nanotubes. Furthermore, the selective polymer wrapping/coating enables the dispersion of individual SWCNTs to afford a good separation between m-/sc-nanotubes. This feature provides a path towards high purity which will be required for many electronic device applications. In addition, the composition and architecture of the polymer side chains can be adjusted to balance the solubilisation and the interaction with the nanotubes to optimize the selectivity. Also, the molecular design of the polymer main-chain will provide the conjugated polymer a unique interaction with the nanotubes as well as some other desired properties.

In order to enhance the selectivity, extracting with the conjugated polymer is preferably accomplished in a non-polar solvent and is preferably the same solvent in which the enriched sc-SWCNT dispersion is exposed to an inorganic adsorptive medium. The mixture of sc-SWCNTs and m-SWCNTs may be dispersed in the solvent in the presence of the conjugated polymer. The mixture of sc-SWCNTs and m-SWCNTs is preferably dispersed in the solvent at a concentration of from about 0.1 mg/mL to about 10.0 mg/mL, preferably about 0.4 mg/mL to about 2.0 mg/mL, with a polymer/SWCNT ratio of 0.5:1 to 10:1. The polymer/SWCNT ratio will significantly impact the extraction yield and sc-purity. A high ratio will produce a high yield but a low purity. Formation of the dispersion may be assisted by known techniques in the art, for example, sonication, mechanical agitation and the like. Subsequent separation of the well-dispersed SWCNTs from the poorly-dispersed SWCNTs collects polymer-coated SWCNTs in the dispersion, while undispersed non-coated SWCNTs are removed. The subsequent separation may be accomplished by any suitable method, for example centrifugation, filtration and the like, or any combination thereof. Centrifugation is preferred. Such centrifugation typically yields sediment and supernatant, the sediment having gravitated to the bottom of a centrifuge tube and the supernatant being the liquid on top. The sediment is enriched in m-SWCNTs and the supernatant is enriched in sc-SWCNTs, relative to the starting mixture. Because the conjugated polymer selectively interacts with the sc-SWCNTs to keep them dispersed, the SWCNTs remaining in the dispersion (e.g. in the supernatant) after separation are enriched in sc-SWCNTs, while the SWCNTs separated from the dispersion (e.g. in the sediment) are enriched in m-SWCNTs. more extraction processes can be applied to the sediment and the resulting combination dispersion will give a higher yield of sc-SWCNTs.

The dispersion containing polymer-coated SWCNTs enriched in sc-SWCNTs may be exposed directly to the inorganic adsorptive medium, or further processing may be performed prior to contacting the enriched sc-SWCNT dispersion with the inorganic adsorptive medium. The further processing may be, for example: isolating the polymer-coated SWCNTs from the dispersion by filtration and, washing and then re-dispersing the polymer-coated enriched sc-SWCNTs to form an enriched sc-SWCNT dispersion. Filtration and washing of the enriched sc-SWCNTs can remove excess polymer which is not attached to SWCNTs, thus allowing a polymer:SWCNT stoichiometry to be adjusted. This is an important parameter to influence the effectiveness of the subsequent adsorption purification and the device performance as well.

Once prepared, the enriched sc-SWCNT dispersion is exposed to an inorganic adsorptive medium in a non-polar solvent, preferably in the same solvent as for polymer extraction. The inorganic adsorptive medium selectively binds m-SWCNTs to further separate the sc-SWCNTs from the m-SWCNTs. The inorganic adsorptive medium and SWCNTs in the enriched sc-SWCNT dispersion are preferably present in a mass ratio of inorganic adsorptive medium to SWCNT of about 10:1 to 1000:1, or more preferably about 50:1 to 500:1. The inorganic adsorptive medium preferably comprises an inorganic oxide, for example silica (porous or non-porous), alumina, titania, a zeolite, a diatomaceous earth (e.g. Celite™) or mixtures thereof. The inorganic adsorptive medium may be functionalized to assist with specificity of reaction toward m-SWCNTs over sc-SWCNTs. Some suitable functional groups include, for example, cyano, amino, hydroxyl, mercapto, halo (F, Cl or Br), alkyl and aromatic groups. The inorganic adsorptive medium should be stable in non-polar solvents. The non-polar solvent preferably comprises an organic solvent, more preferably an organic aromatic solvent. Some examples of non-polar solvents include, for example, toluene, benzene, ethyl benzene, xylenes, 1-methylnaphthalene and mixtures thereof. Toluene is preferred. After mixing, the mixture was allowed to interact for a period of time from 5 min to 5 h, preferably 10 to 60 min by using stirring, shaking or sonication, bath sonication is preferred.

After exposing the enriched sc-SWCNT dispersion to the inorganic adsorptive medium, the sc-SWCNTs may be recovered by any suitable method, for example centrifugation, filtration and the like, or any combination thereof. Centrifugation is preferred. The adsorbent enriched in m-SWCNTs is a solid that is easily collected in the sediment of a centrifugation process while the sc-SWCNTs remain dispersed in the supernatant. Further processing and isolation of the sc-SWCNTs may be accomplished by filtration and washing to remove free polymer. The recovered sc-SWCNTs have a conjugated polymer wrapping/coating and may be used in various applications including photovoltaic devices (PVDs), thin film transistors (TFTs), printable electronics and sensors.

The present hybrid enrichment process comprises two-steps, the first step based on selective dispersion and extraction of semiconducting SWCNT using conjugated polymer followed by a second step based on an adsorptive process in which the product of the first step is exposed to an inorganic absorptive medium to selectively bind predominantly metallic SWCNTs such that what remains dispersed in solution is further enriched in semiconducting SWCNTs. The process is easily scalable for semi-conducting single-walled carbon nanotube (sc-SWCNT) enrichment with average diameters in a range, for example, of about 0.6 to 2.2 nm. In addition, there are other advantages of this hybrid enrichment process compared to the extraction method alone. For example, sc-SWCNT purity is promoted to a higher level which a single or multiple polymer extraction is not able to achieve, thereby resulting in better device performance. Further, both high sc-SWCNT purity (for example greater than 99%) and a high yield (up to about 20% or higher) are obtainable together. A high sc-SWCNT purity from an extraction process only can be achieved when a low polymer/SWCNT ratio such as 1:1 is used. At this ratio, a low yield always results. There is a trade-off between the purity and the yield in the extraction process. However, by using the present hybrid process, a product with a high yield can be obtained in the extraction step by using a high polymer/SWCNT ratio, for example 4:1. Then the purity can be promoted in the adsorption step at a yield of above 50%. This process will maintain the combination yield at a high level (for example >13.2×0.5=6.6%) while providing high sc-SWCNT purity with a $\phi_i$ value larger than 0.40. To obtain a similar yield by polymer extraction, a $\phi_i$ value of only about 0.37 can be obtained, where $\phi_i$ is as defined herein below.

The hybrid process disclosed herein provides a combination of relatively higher yield with improved semiconductor purity over prior art processes. An extraction step may be optimized to improve yield at the expense of some purity while a subsequent adsorption step may be optimized to improve purity without unduly sacrificing yield. The improved semiconductor purity enables the fabrication of better transistors with high mobility values and current on/off ratios compared to devices fabricated by selective polymer extraction alone. Thus, a low-cost, high-yield process for purifying sc-SWCNTs has been provided, which results in hitherto unseen thin film transistor (TFT) device performance based on sc-SWCNTs.

Further features will be described or will become apparent in the course of the following detailed description.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
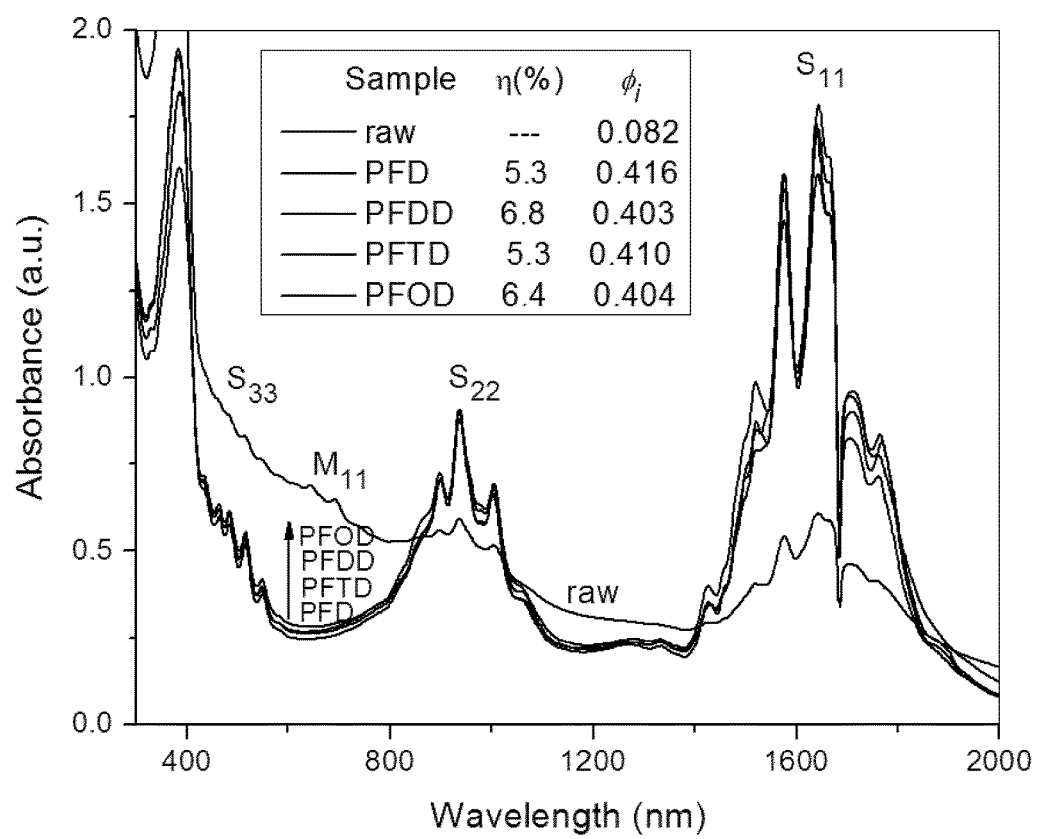
FIG. 1 depicts absorption spectra, yield ($\eta$) and $\phi_i$ ratio of SWCNT products from the extraction of laser SWCNTs by PFD, PFDD, PFTD and PFOD at a concentration of 0.5 mg/mL, and a polymer:SWCNT ratio of 0.8 in toluene.

Crude laser SWCNTs were first dispersed in toluene using a fluorene polymer with adequately long alkyl side-chains ($C_{10}$-$C_{18}$) with the assistance of horn sonication. The dispersed solution was centrifuged at a very moderated RCF (relative centrifuge force of about 8000 g) to obtain a semiconducting SWCNT (sc-SWCNT) enriched dispersion, which was then exposed to a small amount of absorbent, such as silica particles, with stirring or bath sonication for about 20 min. The mixture was centrifuged again at RCF of about 8000 g to remove the absorbent and the supernatant was filtered through a 0.2 μm Teflon™ membrane to collect the enriched nanotubes. The effectiveness of the adsorption step for the purity was studied using UV and Raman spectroscopy, and the results showed that the product from the supernatant has significantly promoted sc-purity, while the materials on the absorbent surface contain metallic enriched nanotubes. The effectiveness of the adsorption step to promote the purity was further evaluated by treating an approximately 99% pure PFDD (poly(9,9-diC$_{12}$alkylfluorene) enriched sc-SWCNT dispersion with a $\phi_i$ value of 0.391, the adsorption treatment promoted this value to 0.408. Both the samples before and after the adsorption treatment were compared by thin film transistor (TFT) device test. TFT devices prepared from the purity promoted sample showed an on/off current ratio of 7.2×10$^5$ and a mobility of 61 cm$^2$/Vs for a device with 25 μm of channel length and 100 μm of channel width. Furthermore, the test of the all 25 devices on a chip showed all the devices had good transistor performance with on/off ratio over 10$^4$ and mobility over 25 cm$^2$/Vs, while only 12 devices out of the 25 from the sample before adsorption treatment showed a regular TFT character with motilities of 10-30 cm$^2$/Vs and on/off ratios of about 10$^4$. This result indicates that the purity is significantly improved by the adsorption treatment. Further details are provided in the following examples. Meanwhile, the same adsorption process was also applied to a less pure enriched dispersion with a $\phi_i$ value of 0.365, the UV and Raman spectra showed that the adsorption purified sample has the same purity as the one from the pure starting materials with $\phi_i$ value of 0.407, and a similar device performance. While the best device from the sample before this treatment only had a mobility of 28 cm$^2$/Vs and on/off ratio of about 3.

Materials and Methods:
Characterizations

Absorption spectra were collected on a UV-Vis-NIR spectrophotometer (Cary 5000, Varian) in a wavelength range from 300 to 2100 nm. A double beam mode was used with a pure solvent cuvette placed in the reference channel. Raman spectra were acquired with an InVia Raman microscope (Renishaw), using 514 nm (2.41 eV), 633 nm (1.96 eV), and 785 nm (1.58 eV) laser excitation sources and 50× magnification objective lens. Spectra were recorded in 100-3000 cm$^{-1}$ region with a resolution of 4 cm$^{-1}$. PLE mapping was done in a home-made system with a titanium-sapphire laser used as a wavelength tunable excitation with a tuning range from 720-1050 nm.

Figure 4:
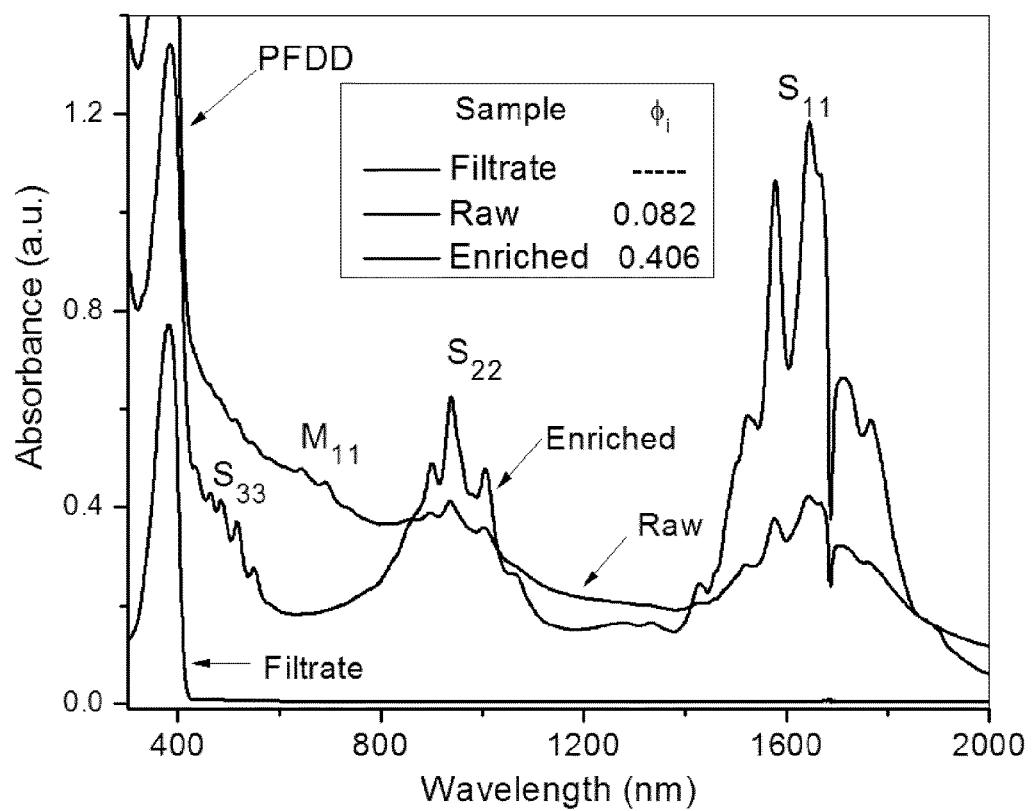
FIG. 4 depicts an absorption spectrum of enriched sc-SWCNTs in toluene. The spectra of the raw SWCNT dispersion from this process before centrifugation and the filtrate from the filtration were also collected for comparison. The solutions of the raw dispersion and the filtrate were diluted 20 times from the original.
Figure 5:
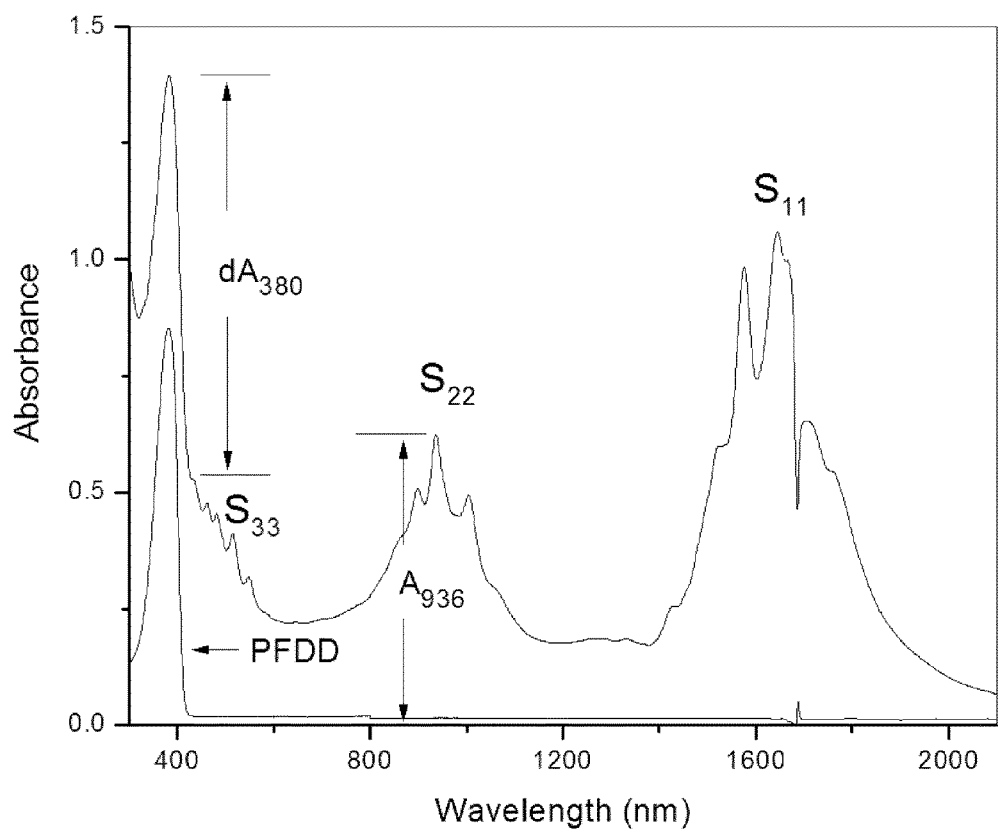
FIG. 5 depicts absorption spectra of PFDD and PFDD enriched laser sc-SWCNT, in which the calculation of the absorbance of the PFDD peak at 380 nm ($dA_{380}$) and the $S_{22}$ peak at 936 nm ($A_{936}$) is illustrated.

For yield and SWCNT concentration measurement, absorption spectroscopy was used. Yield is expressed as the mass percentage of sc-SWCNT in the enriched dispersion relative to the total mass of SWCNTs present in the raw material, which was calculated from the TGA analysis. Principally, the yield value can be obtained by comparing the weight of sc-SWCNTs in the final product of the enrichment with the weight of starting raw material. But the final product is polymer wrapped/coated SWCNTs and therefore it is a mixture of polymer and SWCNTs. The polymer content in the final product has to be detected in order to evaluate the sc-SWCNT content. A spectroscopic approach is known in the art (Naumov-2011), which appears to be a more convenient method to simultaneously determine both the amount of polymer and sc-SWCNTs in the final product. Therefore, polymer and SWCNT concentration (mg/mL) of the enriched dispersions are calculated from their absorption spectra, and then the yield of the enrichment can be deduced. From the absorption spectrum of the enriched product, such as that shown in FIG. 1, it is apparent that the polymer (PFDD in this case) only has a single peak at 380 nm and sc-SWCNT shows three absorption bands in the regions of 1400-1900 nm for $S_{11}$, 700-1100 nm for $S_{22}$ and 450-550 nm for $S_{33}$. All these bands and the PFDD peak are well separated. This permits the use of Beers law (A=ɛlc) to correlate the peak absorbance (A) and the concentration of polymer and sc-SWCNTs (c in mg/mL) through the extinction coefficient (ɛ in mL/mg·cm), where l is the path length in cm and is 1 cm in this work. The extinction coefficient of the polymer at 380 nm ($\varepsilon_{380}$) and the sc-SWCNT at 936 nm ($\varepsilon_{936}$) was determined from the pure polymer and from a highly purified sc-SWCNT sample (Sample 0.5 seen in FIG. 4), with sc-purity over 99% as will be shown in the following discussion. Therefore, 0.89 mg of PFDD was dissolved in 10 mL of toluene and the absorption spectra of its diluted solutions (by factors of 5, 6, 8, 10, 12 and 16) were collected and displayed with the plot of absorbance at 380 nm vs. concentration inserted. The linear best fit line of this plot gives the extinction coefficient of the polymer ($\varepsilon_{380}$) of 59.8 mL/mg·cm. A similar work on 1.65 mg of the sc-enriched SWCNT sample resulted in an apparent extinction coefficient of the enriched nanotube samples of 22.8 mL/mg·cm. This value is an apparent extinction coefficient due to the sample being a mixture of polymer and nanotubes. Therefore the polymer influence has to be eliminated from this value. This was done by a similar analysis of the absorbance at 380 nm. Because the PFFD absorption peak at 380 nm overlaps with the background signal, the absorbance at 380 nm for PFDD (dA$_{380}$) is measured as shown in FIG. 5. The plot of dA$_{380}$ vs. concentration of this sample gives an apparent extinction coefficient at 380 nm of 31.6 mL/mg·cm. Comparison of this value with $\varepsilon_{380}$ of the pure PFDD (59.8 mL/mg·cm) yields a 52.8% PFDD content of this sample. Therefore the extinction coefficient of the enriched laser SWCNT should equal 22.8/(1−0.528)=48.3 mL/mg·cm. It should be noted that this value is slightly higher than the extinction coefficient of 41.1 mL/mg·cm for the purified laser SWCNTs reported in the prior art, where amorphous carbon was removed and m- and sc-SWCNTs remained compared to raw laser SWCNTs. This difference is due to m-SWCNT impurity present in the sample of the prior art.

Figure 6:
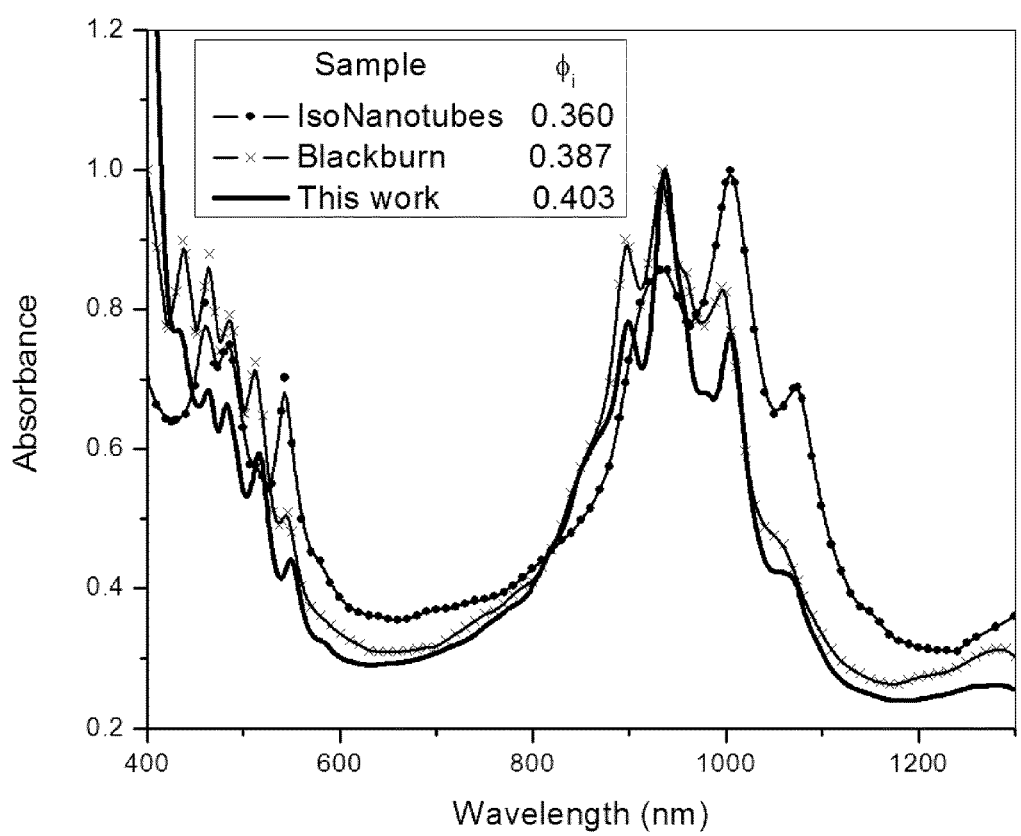
FIG. 6 depicts a comparison of the absorption spectrum of PFDD extracted sample in this work with spectra of the Blackburn's sample (Mistry-2013) and IsoNanotubes (Naumov-2011). For a reasonable comparison, the spectra were normalized based on the $S_{22}$ band. The curves for Blackburn's sample and IsoNanotubes are re-plotted from Figure S8 of Mistry-2013.

For semiconducting (sc-) purity assessment, SWCNT peak ratios $\phi_i$ in absorption spectra were used. As can be seen in FIG. 1, the raw laser SWCNTs has absorption peaks in different wavelength regions for sc-nanotubes ($S_{11}$ in 1400-1900 nm, $S_{22}$ in 750-1150 nm, $S_{33}$ in 420-580 nm) and for m-tubes ($M_{11}$ in 600-750 nm). This feature is common for large-diameter SWCNTs such as laser, arc-discharge and plasma SWCNTs. Based on this property, Nanointegris estimated the purity of their arc-discharged sc-SWCNTs, and 99% of sc-purity of their product (IsoNanotubes) produced by a DGU technique was calculated by comparing integrated areas of the $S_{22}$ and $M_{11}$ peak envelops. However, this method is not suitable for a product with purity higher than 99%. As shown in FIG. 4, when the purity increases beyond a certain level, the $M_{11}$ peaks at 646 nm and 696 nm do not appear anymore, while the background intensity in this region keeps decreasing as the impurity is further removed. Under this circumstance, Blackburn in one of his recent papers (Mistry-2013) compared the UV spectrum of their sample with that of the NanoIntegris product, IsoNanotubes, (Naumov-2013) and found that their enriched sample had a deeper valley between the $S_{22}$ and $S_{33}$ absorption bands. Therefore, they concluded that they achieved an equivalent or higher sc-purity than the NanoIntegris Iso-Nanotubes. Using the same strategy, the absorption spectrum of sc-SWCNT samples produced in the present work shown in FIG. 4 Sample 0.5 with the spectra of the Blackburn sample and Nanointergris sample were compared as shown in FIG. 6. For a reasonable comparison, the spectra were normalized based on the $S_{22}$ band. FIG. 6 demonstrates that the sc-SWCNT sample of the present work has better resolved $S_{22}$ peaks and slightly deeper background intensity in this region, indicating a higher purity.

Figure 7:
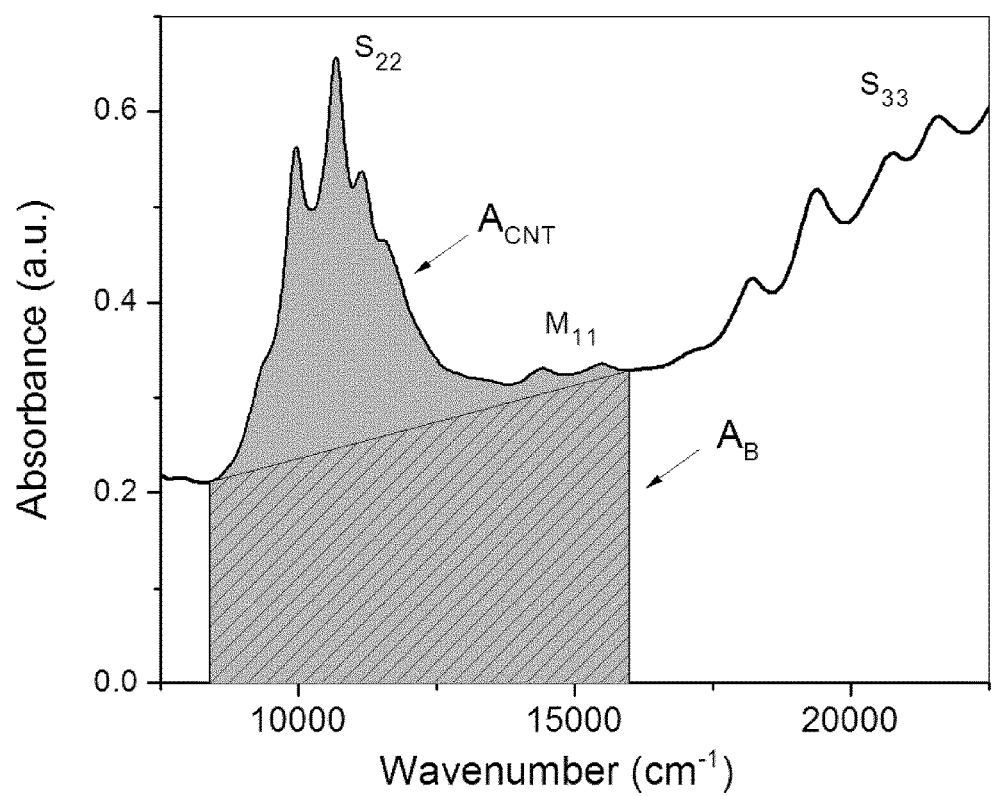
FIG. 7 depicts a schematic illustration of the definition of the SWCNT peak ratio ($\phi_i=A_{CNT}/(A_{CNT}+A_B)$), where $A_{CNT}$ is the enveloping area of the $M_{11}$ and $S_{22}$ bands enclosed by the linear baseline (gray shaded area) corresponding to the amount of m- and sc-SWCNTs in the sample, and $A_B$ was the area covered by the linear baseline (striped area) of the same region, mainly attributed to amorphous carbon impurity.

However, this kind of comparison is not convenient for a quick evaluation of the purity. Therefore a metric was derived from the absorption spectrum for this purpose. As shown in FIG. 4, the enrichment not only removed the $M_{11}$ absorption band, but also significantly reduced the background intensity in the $M_{11}$ and $S_{22}$ region. Because the main contribution to absorption background is the featureless absorption of amorphous carbon, the integrated area that the $M_{11}$ and $S_{22}$ peaks envelop compared to the total area in this region should be correlated with the SWCNT content in the sample. Therefore, Curve 8.0 of FIG. 2 was taken as an example and was re-plotted with absorbance vs. wavenumber in FIG. 7, from which SWCNT peak ratio ($\phi_i = A_{CNT}/(A_{CNT}+A_B)$) is defined, where $A_{CNT}$ was the enveloping area of the $M_{11}$ and $S_{22}$ bands enclosed by the linear baseline (gray shaded area) in the region from 8400 $cm^{-1}$ to 16000 $cm^{-1}$ (1900-625 nm), attributed to the nanotubes, and $A_B$ was the area covered by the linear baseline (striped area) of the same region, attributed mostly to amorphous carbon. A similar model covering only the $S_{22}$ region was proposed in the prior art (Itkis-2003) for evaluating nanotube content of pristine SWCNT products, but this value for most as-prepared SWCNT sample was found to be low. Further, as the SWCNT content versus amorphous carbon content increased the SWCNT content approached a maximum value of 0.325 for pure SWCNT samples. However, the present work shows that the SWCNT peak ratio ($\phi_i$) reaches a higher value for highly semi-conducting enriched samples and thus the Itkis model is no longer relevant. This is because the removal of the $M_{11}$ peak due to the elimination of m-SWCNTs results in lower background intensity in this region, and thus leads to a small $A_B$ value and a higher $\phi_i$ ratio. This feature in reverse makes $\phi_i$ very sensitive to the m-SWCNT content in an enriched sample. Consequently, $\phi_i$ was adopted here to evaluate the sc-purity of the enriched samples, where a large value is more reflective of the variation in semiconducting/metallic content in high sc-purity samples as opposed to nanotube content versus non-nanotube carbon content. Integrations of the absorption curves of FIG. 4 Sample 0.5 and Blackburn's sample in the range of 8400-16000 $cm^{-1}$ (1190-625 nm), and IsoNanotubes in the range of 8000-15200 $cm^{-1}$ (1250-660 nm) give 0.403, 0.387, and 0.360 of the $\phi_i$ ratios for these three samples. This result agrees well with that from the absorption spectra as discussed below.

EXAMPLE 1

Polyfluorene Derivatives

This example provides details of the preferred conjugated polymers.

Polyfluorenes with two alkyl groups at 9-position with a length from $C_8$ to $C_{18}$ were prepared by Suzuki reaction adapted from prior art methods (e.g. Ding 2002). The obtained polymers with the basic characterization data are listed in Scheme 1 and Table 1, where $T_d^{1\%}$ and $T_g$ were measured from thermogravimetric analyses (TGA) and differential scanning calorimetric (DSC) curves.

Scheme 1-Structure of polyfluorenes

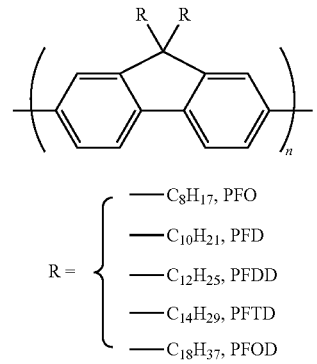

$R =$ 
- $C_8H_{17}$, PFO
- $C_{10}H_{21}$, PFD
- $C_{12}H_{25}$, PFDD
- $C_{14}H_{29}$, PFTD
- $C_{18}H_{37}$, PFOD

TABLE 1

Characterization data of polyfuorenes

| | Polymer | | | | |
|---|---|---|---|---|---|
| | PFO($C_8$) | PFD($C_{10}$) | PFDD($C_{12}$) | PFTD($C_{14}$) | PFOD($C_{18}$) |
| $M_n$ (kDa) | 26.7 | 13.6 | 21.7 | 13.4 | 23.7 |
| PDI | 2.4 | 2.7 | 4.1 | 3.0 | 4.2 |
| $T_g$ (° C.) | 136 | 101 | 48 | 40 | 35 |
| $T_d^{1\%}$ (° C.) | 390 | 380 | 381 | 374 | 382 |

EXAMPLE 2

Enrichment of Raw SWCNTs with Polyfluorene Derivatives

This example provides details of extracting a mixture of sc-SWCNTs and m-SWCNTs with a conjugated polymer to produce an enriched sc-SWCNT dispersion.

A typical enrichment was conducted by dispersing 25 mg of laser-ablation produced SWCNTs into 50 mL of toluene with 20 mg of polyfluorene. The mixture was homogenized for 30 min at 30° C. using a horn sonicator (Branson Sonifier 250, maximum power, 200 W) with a 10 mm tip operated at a duty cycle of 40% and output of 50%. The dispersion was then centrifuged at a relative centrifuge force (RCF) of 7600 g (8,000 rpm on SS-34 rotor) for 30 min. The supernatant was filtered through a Teflon™ membrane with 0.2 μm pore size to collect the extracted SWCNTs. The collected SWCNTs were rinsed with 5 mL of toluene twice to remove free polyfluorene, and then re-dispersed in 5 mL of toluene using a bath sonicator for 5-10 min. For a multiple extraction, the precipitate was re-dispersed and the above process was repeated using a desired SWCNT concentration and a polymer:SWCNT ratio.

A number of factors can affect the enrichment process, including molecular weight of the polymer, polymer side-chain length, polymer:SWCNT ratio and whether multiple extractions are performed. These factors were evaluated and an optimized enriching procedure developed.

Molecular Weight

A series of polyfluorenes with different molecular weights was tested for their ability to disperse and extract laser-ablation produced (laser) SWCNTs. Polyfluorenes with a molecular weight lower than 8,000 Da had less capability to disperse laser SWCNTs. This phenomenon is consistent with the observation that polyfluorene-type oligomers with no less than 8 repeating units are preferred for a good dispersion of small-diameter SWCNTs. With the molecular weight above 10,000 Da, there is no apparent difference in dispersing and selectively extracting sc-SWCNTs. However, very high molecular weight significantly increases the viscosity of the polymer wrapped nanotubes, leading to a practical limitation in handling the material during processing. Therefore, an optimum number average molecular weight ($M_n$) between 10,000 and 30,000 Da is desired. This molecular weight can be easily achieved by simply adjusting the ratio of dibromide and bis(boronate) monomers in the feed of the polymerization. Table 1 above lists the number average molecular weight ($M_n$) and polydispersity index (PDI) of the polymers used to enrich SWCNTs.

Polymer Side Chain Length

Though fluorene homopolymers with short alkyl chains including octyl (PFO), hexyl (PFH), and 2-ethylhexyl (PF2/6) showed a high potential to enrich sc-SWCNTs with small diameters such as HiPco and CoMoCat nanotubes, these homopolymers are less useful to effectively disperse large-diameter SWCNTs. The dispersing capability of PFO drops off when the diameter of nanotubes is above about 1.1 nm. Therefore, a series of fluorene homopolymers with linear alkyl groups varying from $C_8$ to $C_{18}$ were tested for their ability to disperse and extract laser SWCNTs. PFO ($C_8$), PFD (CO, PFDD ($C_{12}$), PFTD ($C_{14}$), and PFOD ($C_{18}$) were prepared and tested for SWCNT extraction at a SWCNT concentration of 0.5 mg/mL and a polymer:SWCNT ratio of 0-0.8 in toluene. The tests showed that PFO extracted small amounts of nanotubes in toluene. All other polymers in the series proved to be more effective to disperse and extract sc-SWCNTs as can be seen in absorption spectra of the enriched samples compared in FIG. 1.

FIG. 1 shows that the nanotubes enriched by PFD, PFDD, PFTD and PFOD gave a similar absorption spectrum with a yield ($\eta$) of 5.3%, 6.8%, 5.4% and 6.4%, and a peak ratio ($\phi_i$) of 0.416, 0.403, 0.410 and 0.404, respectively. There is a trade-off between yield and purity. An increased yield can be easily obtained by using a higher polymer:SWCNT ratio, however at the expense of the sc-purity (vide infra). The absorption spectra in FIG. 1 confirm a very high sc-purity for the enriched sc-SWCNTs with the M11 peaks completely removed. Further, $\phi_i$ ratio increased from 0.086 for the raw laser SWCNT sample to about 0.41 for the extracted SWCNTs, which is an indication of increased sc-SWCNT purity in the extracted samples. Fluorene homopolymers with alkyl side chains of 10 carbons or longer are more effective at dispersing large-diameter SWCNTs and provide high selectivity in wrapping sc-nanotubes. Though the polymers evaluated gave very similar yields and purity for the enrichment, longer side chains provide greater solubilizing ability thereby improving stability of the nanotube dispersion by reducing the formation of bundles. However, nanotube dispersions with longer alkyl side-chain polymers possess higher viscosities making the filtration step more difficult during the enrichment process. Taking all these effects into consideration, PFDD with $C_{12}$ side chains was selected for further detailed enrichment studies.

PFDD:SWCNT Ratio

Figure 2:
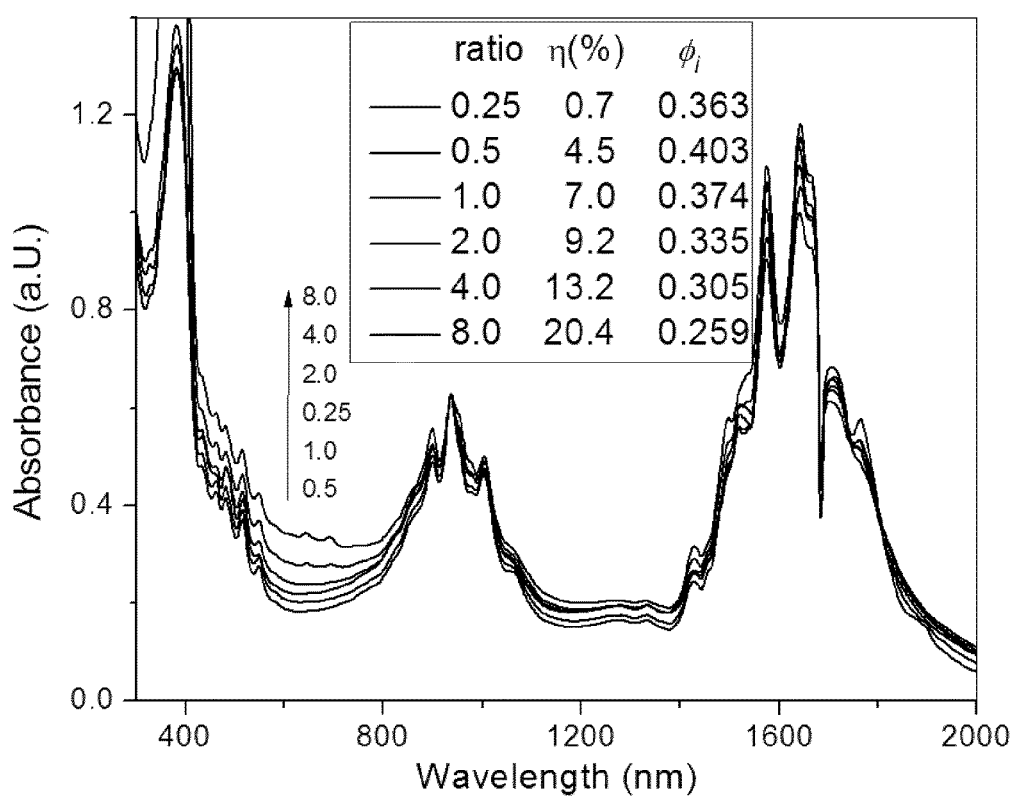
FIG. 2 depicts absorption spectra of SWCNT samples extracted from laser SWCNTs by PFDD at a tube concentration of 0.4 mg/mL in toluene and a polymer:SWCNTs ratio of 0.25:1, 0.5:1, 1.0:1, 2.0:1, 4.0:1 and 8.0:1.

A series of PFDD:SWCNT mass ratios from 0.25:1 to 8.0:1 were evaluated for nanotube enrichment. FIG. 2 shows that ratio of 0.5:1 give the deepest valley around 700 nm, indicating the best result of sc-purity in this extraction test. The SWCNT peak ratio $\phi_i$ of this enriched sample reached 0.403. This peak ratio value is higher than the peak ratio for a prior art sample believed to have over 99% of sc-SWCNT content. As the PFDD:SWCNT ratio increases, the purity progressively decreases with metallic peaks gradually appearing at 646 and 696 nm and the absorption background in 700 nm region becoming gradually stronger. It is interesting that the extraction at the lowest PFDD:SWCNT ratio (0.25:1) did not give the highest purity, having a peak ratio $\phi_i$ of only 0.375, lower than the value (0.403) at the PFDD:SWCNT ratio of 0.5:1. This phenomenon may be related to the lower yield of this extraction (0.7%). At this polymer:SWCNT ratio, only a small amount of the solid product was extracted from the dispersion. It might contain more non-tube impurities such as fullerenes and small carbon particle impurities, which are usually present in a raw SWCNT sample, and have high solubility in toluene and could easily enter in the supernatant during polymer extraction.

The sc-SWCNT purity of this series samples was also investigated by Raman study. The RBM of the spectra excited at 785 nm showed that the sample with a polymer:SWCNT ratio of 0.5:1 had a nearly flat baseline in the metallic region of 135 $cm^{-1}$ and 175 $cm^{-1}$, indicating a high sc-purity. As the polymer:SWCNT ratio changed from 0.5:1 to 8.0:1, a broad metallic band centered at 162 $cm^{-1}$ gradually appeared and showed a good correlation of the peak intensity with the $\phi_i$ value. This result confirmed the observation in the absorption spectroscopy study, and also proved that $\phi_i$ is a good metric for a quick evaluation of the purity of sc-SWCNT samples.

On the other hand, the data listed in FIG. 2 indicates that the yield increases significantly with higher polymer:SWCNT ratios. At a ratio of 0.25:1, few nanotubes are extracted. As the ratio increases from 0.25:1 to 0.5:1, the yield rapidly increases from 0.7% to 4.5%, and then with the ratio further increasing to 8.0:1, the yield reached 20.4%. Therefore, increasing the usage of polymer in the extraction promotes yield, while sacrificing sc-purity. A polymer:SWCNT ratio between 0.5:1 and 1.0:1 gives high purity and reasonable yield of 5-10% for a single extraction.

Multiple Extractions

Figure 3:
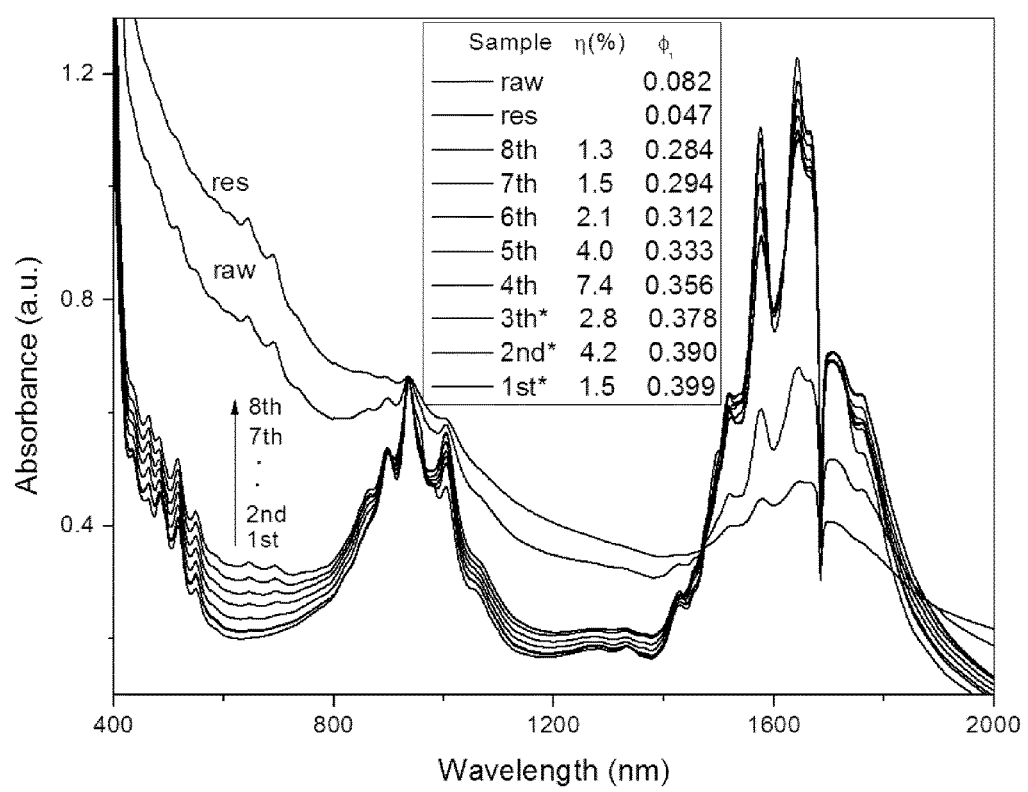
FIG. 3 depicts absorption spectra, yield ($\eta$) and $\phi_i$ ratio of enriched sc-SWCNTs for each extraction in a multi-extraction of a laser SWCNTs, the raw material therefrom and the residual of the $8^{th}$ extraction. The SWCNT concentration and polymer:SWCNT ratio were 1.0 mg/mL and 0.8:1 for the first three extractions (marked by *) and 0.33 mg/mL and 0.4:1, for the succeeding five extractions.

As indicated above, the extraction at a SWCNT concentration of 0.4 mg/mL and a polymer:SWCNT ratio of 0.5:1 to 1.0:1 provided a high sc-purity. But the yield of 5-10% is lower than desired. Considering the fact that the crude sample contains 53% SWCNTs and approximately 70% of the nanotubes are semiconducting, a single extraction cycle only yields small portion of the sc-nanotubes present in the source material. Therefore, a multi-extraction process to promote the total yield was attempted. FIG. 3 depicts absorption spectra that result from having performed 8 successive extractions with the succeeding extraction applied to the residual of the previous one. The calculated yield and $\phi_i$ ratios for each extraction are also listed in FIG.

3. It should be noted that the first three extractions were done at a SWCNT concentration of 1.0 mg/mL and a polymer:SWCNT ratio of 0.8:1, and the succeeding five extractions were conducted using a SWCNT concentration of 0.33 mg/mL and a polymer:SWCNT ratio of 0.4:1. This was done to overcome the effect of reduced sc-SWCNT content in the extraction residue that was used for subsequent extraction, in order to retain high selectivity and reasonable yield.

FIG. 3 shows that the products from the first three extractions had a high sc-purity with M11 peaks completely gone, showing peak ratios $\phi_i$ of 0.38-0.40. However, as the extraction number increased, the two metallic peaks at 646 nm and 696 nm gradually appeared with peak ratios $\phi_i$ reduced from 0.40 for the first extraction to 0.28 for the last extraction, indicating a gradual decrease of the sc-SWCNT purity. The yield of the first three extractions is relatively low, with a combination of only 8.5%, but the yield of the fourth extraction becomes much higher at 7.4%, thought to be due to the use of a larger quantity of solvent (3-fold). The yield for the last three extractions dropped significantly, indicating that only a very small amount of accessible sc-nanotubes was left at this stage in the process. The combined yield of all 8 extractions is 24.8%, smaller than the expected sc-content in the crude material. This might be attributed to tightly held SWCNT bundles in the raw material. SWCNTs in very tight bundles become inaccessible to polymer extraction. It should be noted that aggressive horn sonication was only used for the raw sample dispersion for the first extraction process, while mild bath sonication was used in subsequent extractions to help preserve the average length of the SWCNTs above 1 micron. This sonication power might not be strong enough to dissociate the tight bundles. This assumption was verified by comparing the absorption spectrum of the residue after the last extraction (res) with that of the raw material (raw) (see FIG. 3). It indeed shows that the residue has a significantly reduced intensity of S11 and S22 peaks with the M11 peak intensity remaining the same, indicating most of the accessible sc-nanotubes were extracted by the multiple extractions. It is noted that due to high selectivity towards near armchair chiralities, the polymer is likely extracting all the nanotubes with which it has affinity.

Optimized Enriching Procedure

Based on the foregoing evaluation, an optimized procedure for producing an enriched sc-SWCNT dispersion of high purity and reasonable yield involves using poly(9,9-didodecylfluorene) (PFDD) as the conjugated polymer to extract crude SWCNTs dispersed in toluene at a concentration in a range of from about 0.4 mg/mL to about 1.0 mg/mL and with a polymer:SCWNT ratio in a range of from about 0.5:1 to about 1.0:1. The optimized process comprises three steps including nanotube dispersion using sonication, separation using centrifugation and collection using filtration. More specifically, raw SWCNT material was mixed with PFDD in toluene at a PFDD:SWCNT weight ratio of 0.8:1 and a SWCNT concentration of 0.5 mg/mL. The mixture was homogenized by horn sonication for 30 min at 30° C. to promote polymer wrapping. The homogenized dispersion was centrifuged at a RCF of 7,600 g for 30 min. The obtained supernatant was filtered to collect the black solid, which was rinsed with toluene to remove free polymer from the enriched sc-SWCNTs. This enriched sample was re-dispersed in toluene by bath sonication for 5-10 min, and its absorption spectrum was collected and shown in FIG. 4 (Enriched). For comparison, the absorption spectra of the filtrate and the homogenized crude dispersion before centrifugation (Crude) was also collected and compared in FIG. 3. These two solutions were diluted by 20× for the absorption measurement. No SWCNT signal can be seen in the spectrum of the filtrate, indicating that the filtration through a 0.2 µm Teflon™ membrane could effectively collect all the dispersed nanotubes. This result is consistent with having preserved length of the SWCNTs. On the other hand, the intensity of the PFDD absorption band at 380 nm of the filtrate is only about 63% of that of the crude SWCNT dispersion, meaning that a large amount of PFDD is wrapped on the SWCNTs in the dispersion. Well-resolved $S_{11}$ and $S_{22}$ and $S_{33}$ peaks can be seen from the enriched sample. It can also be seen that the $M_{11}$ peaks in the crude sample at about 670 nm are completely removed in the enriched sample and the valleys at approximately 700 nm and 1300 nm become much deeper after the separation with the peak ratio $\phi_i$ increasing from 0.086 for the crude material to 0.406 for the enriched sc-SWCNTs, confirming a high sc-purity.

The sc-SWCNT-enriched and crude samples were also characterized by Raman scattering. The spectra were collected using the 785 nm excitation from thin film samples, which were prepared by casting the dispersions of the enriched sc-SWCNTs and the crude sample on glass slides. The metallic peaks in the RMB region of the Raman spectrum are completely eliminated after the enrichment, consistent with UV-vis-NIR absorption spectroscopy in FIG. 4. The G band of the enriched sample appeared at 1600 $cm^{-1}$, slightly higher than that of the crude sample (1594 $cm^{-1}$), indicating that the nanotubes in the enriched sample have a tighter polymer wrapping on average than in the crude sample. This result confirmed that the selective extraction of sc-SWCNTs is due to preferential wrapping of sc-SWCNTs by PFDD.

Figure 8:
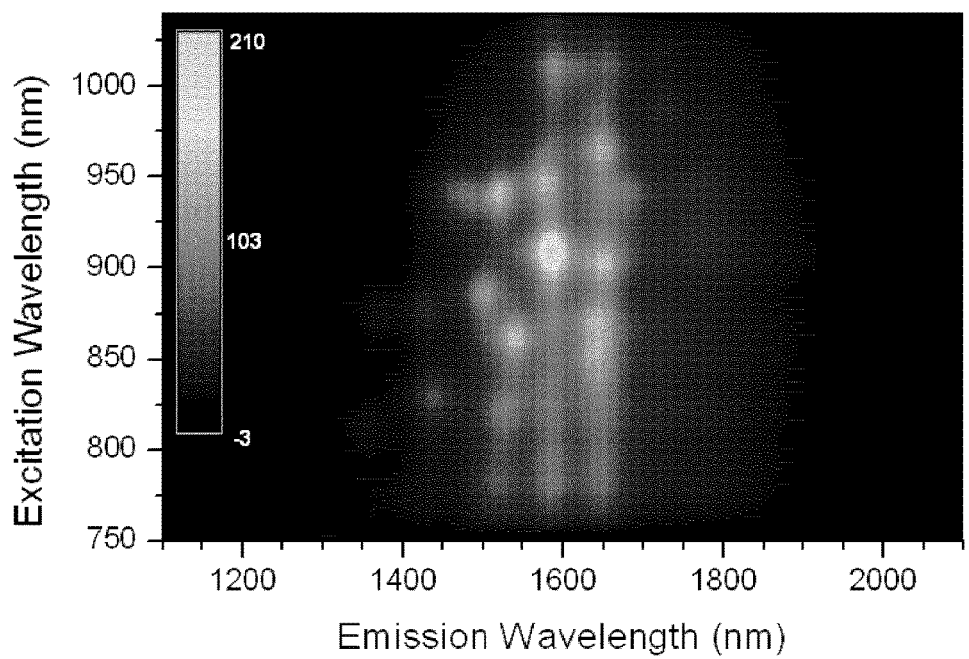
FIG. 8 depicts photoluminescence excitation (PLE) mapping of the sc-SWCNTs enriched by PFDD in toluene. A maximum of 8 or 9 chiralities appear to dominate the spectrum with the (10,9) species being most abundant (emission at 1570 nm, excitation at 910 nm).
Figure 9:
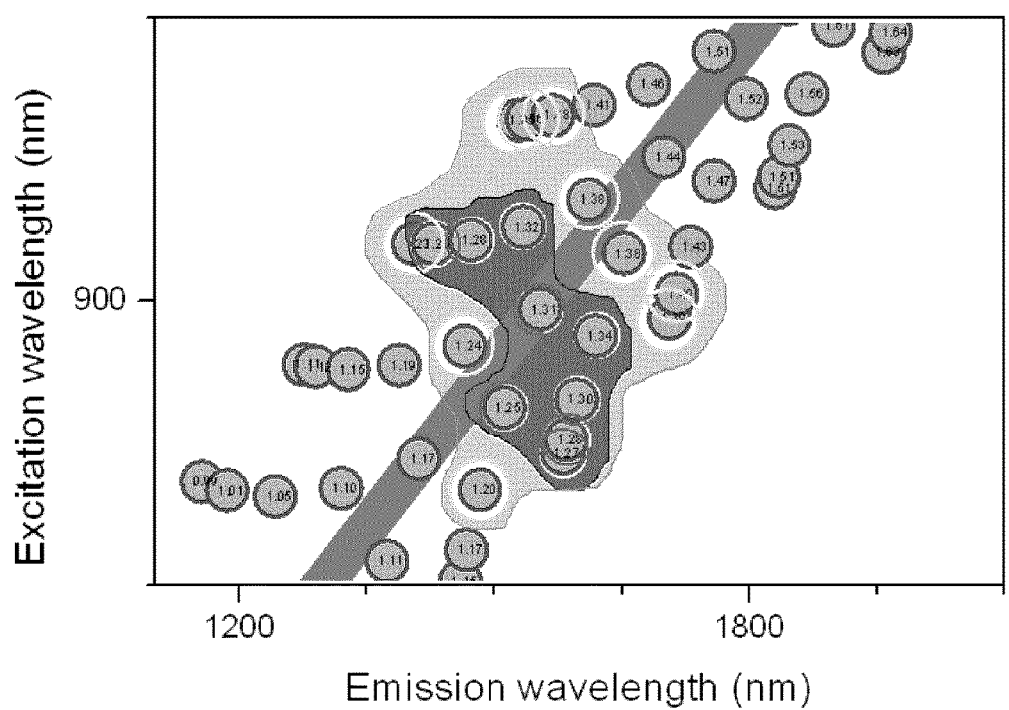
FIG. 9 depicts a chirality map of $S_{22}$ versus $S_{11}$ wavelengths. The two shaded areas show chiralities with a diameter distribution between 1.25 and 1.35 nm (inner shaded area), and between 1.20 and 1.40 nm (outer shaded area). The number of possible chiralities is 9 and 19, respectively.
Figure 10:
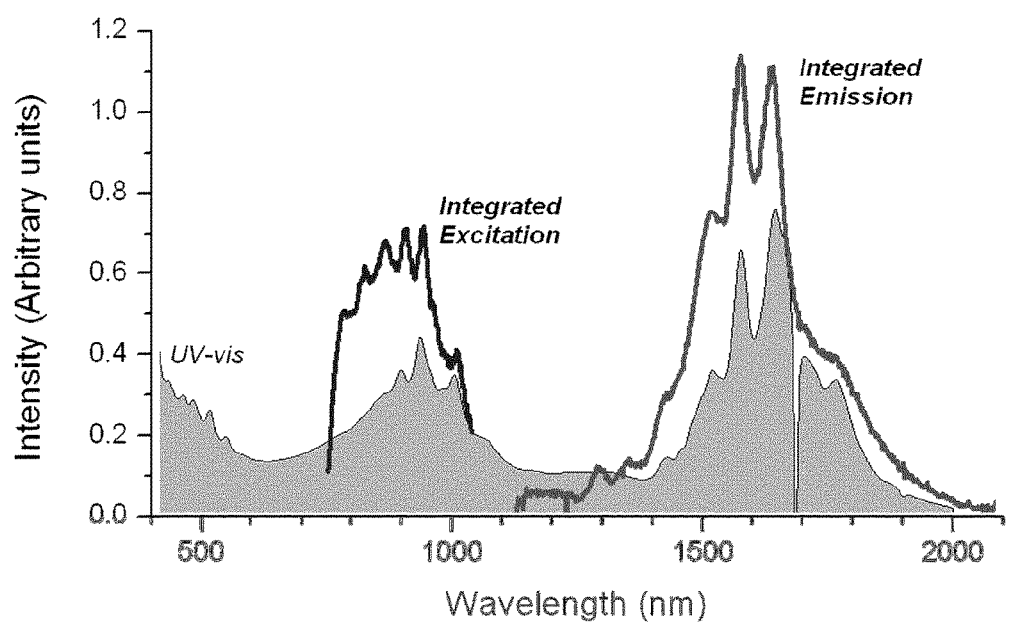
FIG. 10 depicts absorption spectrum (shaded area) and extracted data from the PLE map in FIG. 8 of the sc-SWCNT enriched material. The integrated excitation plot represents the excitation curve and the integrated emission plot represents the emission curve extracted from the PLE map.

Narrow and well defined peaks in the $S_{11}$ (1400-1900 nm), $S_{22}$ (700-1100 nm) and $S_{33}$ (450-550 nm) wavelength range can be observed in the absorption spectrum (FIG. 4). This is a good indication that a limited number of chiralities are present in the sample. Photoluminescence excitation (PLE) mapping (FIG. 8) confirms this result. Approximately eight well-defined peaks could be identified in PLE with one dominant peak at $S_{11}$=1570 nm and $S_{22}$=910 nm. This peak is assigned to the (10,9) chirality and its intensity is roughly twice as large as the other visible peaks. The observed selectivity of PFs toward near-armchair chiralities is known in the art. The presence of seven other chiralities indicates a fairly narrow diameter distribution from 1.25-1.35 nm (FIG. 9). The PL emission and excitation slices of the PLE mapping (FIG. 8) were integrated and the resulting curves were superimposed with the absorption spectrum (FIG. 10). For the sum of emission slices, there is a one to one correspondence with the $E_{11}$ absorption, as expected under the assumption there is a negligible amount of energy transfer between nanotubes in the solution. In other words, the absorption and emission signals are dominated by individualized nanotubes, indicating the bundling is weak if at all present in the dispersion.

EXAMPLE 3

Purity Promotion of Polyfluorene Derivative-enriched Large-diameter sc-SWCNTs with Inorganic Adsorptive Media This example provides details of exposing the enriched sc-SWCNT dispersion from Example 1 to an inorganic adsorptive medium in a non-polar solvent to further increase the purity of the sc-SWCNTs. The inorganic adsorptive media used in this example were unmodified silica gel and silica gel modified with various functional groups, i.e. 3-cyanopropyltriethoxysilane (CPTES), 3-aminopropyltriethoxysilane (APTES), and 0.1% poly-L-lysine. Silica gel (Macherey-Nagel, 60 Å pore size) was purchased from Rose Scientific Ltd. 3-cyanopropyltriethoxysilane (CPTES), 3-aminopropyltriethoxysilane (APTES) and 0.1% poly-L-lysine aqueous solutions were obtained from Sigma-Aldrich and used as received.

Preparation of Silica Gel and Surface Modified Silica Gel

Silica gel with four different surfaces were prepared from 230-400 mesh Macherey-Nagel silica gel 60 Å with pore volume of about 0.75 mL/g. They are: $SiO_2$-CPTES, $SiO_2$-APTES, $SiO_2$-PLL, and $SiO_2$-bare. $SiO_2$-CPTES was prepared by adding silica gel (2.5 g) into 10 mL of 1% CPTES solution in anhydrous toluene. The mixture was added with 5 µL of concentrated HCl and shaken for 120 min. The solid was collected by filtration and rinsed with toluene (50 mL), and was dried in a 120° C. oven for 30 min. $SiO_2$-APTES was prepared in the same way by using 1% APTES solution. $SiO_2$-PLL was produced by adding 10 g of silica gel and 3 mL of PLL (0.1%) solution into 10 mL of $H_2O$. After shaking for 5 min, the mixture was filtered and rinsed with 50 mL water. The solid was dried under high vacuum. A bare silica gel ($SiO_2$-bare) without surface modification was also prepared by drying under vacuum prior to use. CPTES is 3-cyanopropyltriethoxysilane; APTES is 3-aminopropyltriethoxysilane; and PLL is poly-L-lysine.

Adsorption Test Using Silica Gel

Figure 11:
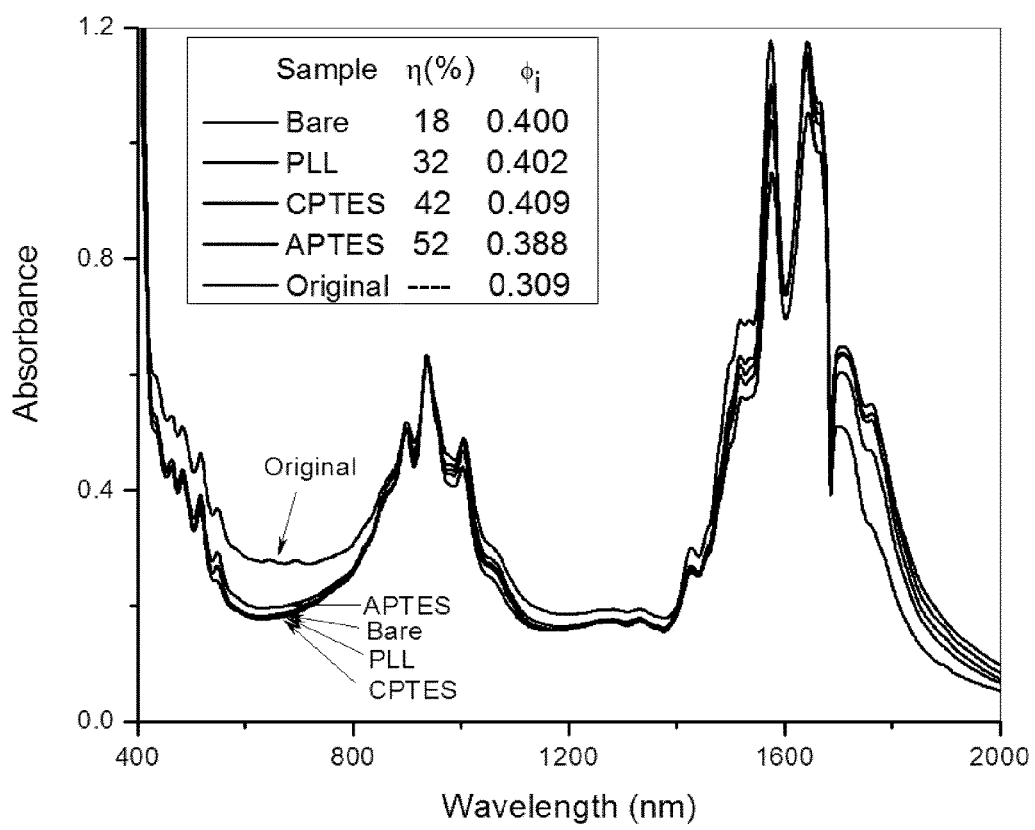
FIG. 11 depicts absorption spectra of an enriched sc-SWCNT dispersion before and after treatment with four different inorganic adsorptive media: $SiO_2$-bare; $SiO_2$-PLL; $SiO_2$-CPTES; and, $SiO_2$-APTES.

An enriched sc-SWCNT dispersion was prepared by extraction of laser SWCNTs with PFDD in accordance with Example 2. The enriched sc-SWCNT had a peak ratio $\phi_i$ of 0.309, a polymer:SWCNT ratio of 3.7:1 and a concentration of about 0.10 mg/mL). 1.5 mL of the enriched sc-SWCNT dispersion and 1.5 mL of toluene were mixed with 0.025 g of the absorbent. The mixture was sonicated for 25 min and then centrifuged. The supernatant was taken for collecting absorption spectra, which were compared in FIG. 11 for the samples treated by different adsorbents. The yield of this treatment was calculated by comparing the intensity of the peak at 936 nm of the samples before and after the treatment. Results and experimental conditions are shown in Table 2. The results show that all the treatments give a high purity with $\phi_i$ values larger than 0.400 except by $SiO_2$-APTES, which produced a slightly lower purity. This might be attributed to the deterioration of the amine group, which may be converted to a salt form due to the use of HCl in the surface treatment causing reduced selectivity. This result shows that silica gels with different modified surfaces selectively absorb m-SWCNTs and promote the sc-purity of PFDD enriched sc-SWCNTs. Surface modification does not have significant effect on the purity of the product, but does have an effect on the yield. The bare silica gel has the highest capacity to bind SWCNTs. A control experiment in which no silica gel is present under identical conditions yields no precipitate and no change in peak ratio.

TABLE 2

Experimental conditions and results of purity promotion test using silica gels

| | Adsorbent | | | |
|---|---|---|---|---|
| | $SiO_2$-CPTES | $SiO_2$-APTES | $SiO_2$-PLL | $SiO_2$-Bare |
| Amount (g) | 0.025 | 0.025 | 0.025 | 0.025 |
| $t_{sonic}$ (min) | 25 | 25 | 25 | 25 |

TABLE 2-continued

Experimental conditions and results of purity promotion test using silica gels

| | Adsorbent | | | |
|---|---|---|---|---|
| | $SiO_2$-CPTES | $SiO_2$-APTES | $SiO_2$-PLL | $SiO_2$-Bare |
| Yield (%) | 42 | 55 | 32 | 18 |
| polymer:SWCNT | 8.8 | 6.7 | 11 | 20 |
| $\phi_i$ | 0.409 | 0.388 | 0.402 | 0.400 |

Effect of Adsorbent Usage

Figure 12:
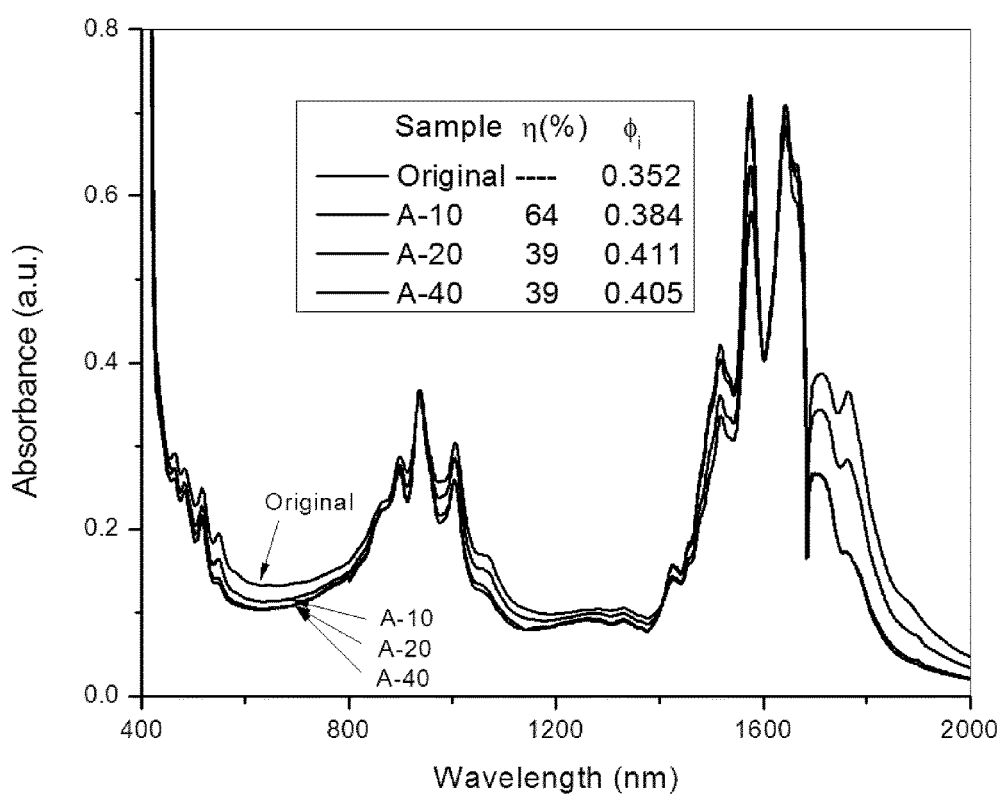
FIG. 12 depicts absorption spectra of the supernatant from $SiO_2$-CPTES treatment of an enriched sc-SWCNT dispersion using different amounts of $SiO_2$-CPTES (10 mg, 20 mg and 40 mg for 10 mL of sc-SWCNT dispersion).

This test was done on a PFDD enriched sc-SWCNT dispersion ($\phi_i$=0.352; polymer:SWCNT=35:1; concentration of about 0.0059 mg/mL). 10 mL of the sc-SWCNT dispersion in toluene was added to 80 mg, 40 mg, 20 mg or 10 mg of $SiO_2$-CPTES and sonicated for 25 min. The mixture was then centrifuged to remove any solid particles and the supernatant was analyzed by UV spectroscopy. The UV spectra are shown in FIG. 12, and the results with the experimental conditions are summarized in Table 3. In this test, the content of SWCNT in each original sample is 0.059 mg and amount of the surface modified silica gel is 80 mg, 40 mg, 20 mg and 10 mg, corresponding to a silica gel:SWCNT ratio of 1400:1, 700:1, 350:1 and 170:1, respectively. The results show that when 80 mg of the modified silica gel was used, almost all the nanotubes were absorbed so the concentration was too low to measure purity, while when 40 mg and 20 mg were used the adsorption gives a reasonable yield (40%) and good purity ($\phi_i$ of about 0.410). Further reducing the amount of modified silica gel usage to 10 mg raised the yield but slightly lowered the purity. This result indicates an $SiO_2$-CPTES:SWCNT ratio of about 350:1 would be good for purity promotion while maintaining yield. On the other hand, as indicated in the last paragraph, the bare silica gel has a higher capacity in binding SWCNTs. When it is used for this adsorption test, an optimized $SiO_2$/SWCNTs ratio was found to be 80:1, which give a yield of 84% and a $\phi_i$ value of 0.406.

TABLE 3

Experimental conditions and results of adsorbent usage test

| | | $SiO_2$-CPTES (mg) | | | |
|---|---|---|---|---|---|
| | original | 80 | 40 | 20 | 10 |
| Volume (mL) | | 10 | 10 | 10 | 10 |
| $t_{sonic}$ (min) | | 25 | 25 | 25 | 25 |
| Yield (%) | | 0.5 | 39 | 39 | 64 |
| $\phi_i$ | 0.352 | N/D | 0.405 | 0.411 | 0.384 |

Large Scale Purification

Figure 13:
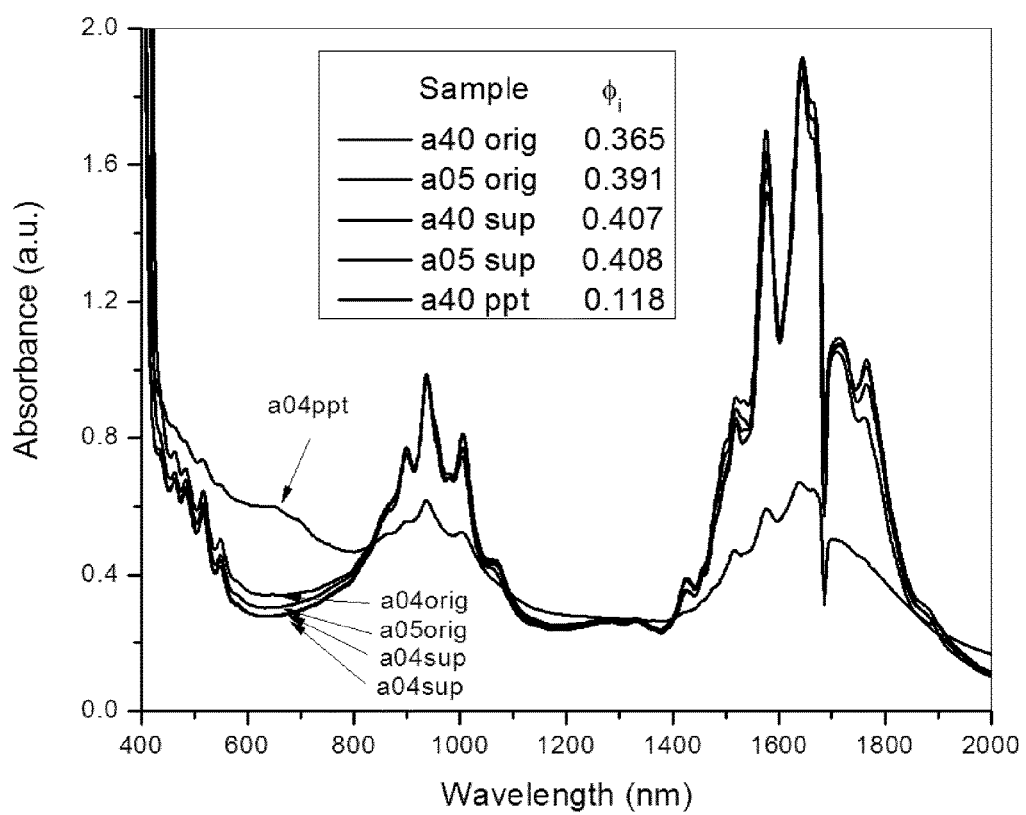
FIG. 13 depicts UV spectra of two original enriched sc-SWCNT dispersions by PFDD extraction with different purities at peak ratios of 0.365 and 0.391 and the UV spectra of the products of silica-CPTES adsorption from the two original dispersions. The UV spectrum of the material adsorbed on the silica particles from Sample a40 was also displayed for comparison.

The above results were verified using a large scale test. The following two PFDD enriched sc-SWCNT dispersions with different sc-purity were tested on a 90 mL scale.
1. Sample-a40: $\phi_i$=0.365; polymer:SWCNT=130:1; SWCNT conc. about 0.012 mg/mL
2. Sample-a05: $\phi_i$=0.391; polymer:SWCNT=30:1; SWCNT conc. about 0.008 mg/mL Because these two dispersions have a higher sc-purity than the dispersion used for the above test, a slightly lower $SiO_2$-CPTES:SCWNT ratio (about 150:1) was used. Therefore, 0.18 g of $SiO_2$-CPTES was added into 90 mL of Sample-a40, and 0.09 g of $SiO_2$-CPTES was added into 90 mL of Sample-a05. Both samples were bath sonicated for 25 min, and then centrifuged at 7600 g for 10 min to separate the supernatant (sup) and precipitate (ppt). The UV of the supernatant was directly measured and the Raman spectra were collected from film, which was prepared by casting a drop of solution on a glass slide. The Raman spectra of the precipitate (ppt) were directly collected from the SWCNTs adsorbed $SiO_2$ powder, while the UV spectra of ppt were collected from the isolated SWCNTs, which were isolated from the absorbent. To achieve this, the precipitate was added to 5 mL of 48% HF aqueous solution, where upon SWCNTs floated in the solution within 5 min. and the floating black solid was collected and rinsed with water, then acetone and then toluene. The obtained SWCNTs were dispersed in 0.1 mg/mL PFDD solution for UV measurement. The UV spectra of the starting materials (orig) and the product from supernatant (sup) and from precipitate (ppt) were compared in FIG. 13 with the relevant results summarized in Table 4. It can be seen that this adsorption process produces highly pure products from both starting materials with different sc-purity with a yield over 70%. The combination yield of the hybrid process is 7.8% for a40 and 3.2% for a05. This result demonstrates that this additional adsorption process effectively promotes the sc-purity of the PFDD enriched sc-SWCNT, with a minimum loss of yield. On the other hand, it demonstrates as a good strategy to use a relative high polymer/SWCNT ratio for the extraction process, it will end-up with a higher yield of the final product from the hybrid process with a similar sc-purity. FIG. 13 also shows that the SWCNT sample isolated from the adsorbent surface has a strong metallic peak at around 650 nm and a much high background intensity, indicating a much lower sc-purity than the original sample. It demonstrates a strong ability of the silica gel in selectively adsorbing m-SWCNTs and other impurities.

TABLE 4

Characteristic data of original dispersions and the products of large scale purity promotion by silica adsorption

| | Sample | a40 | a05 |
|---|---|---|---|
| Before Exposure to $SiO_2$-CPTES Adsorbent | $\phi_i$ | 0.365 | 0.391 |
| | SWCNT Conc. (mg/mL) | 0.012 | 0.008 |
| | Yield (1$^{st}$ step)* | 11.2% | 4.5% |
| After Exposure to $SiO_2$-CPTES Adsorbent | $W_{CNT}$ | 0.762 | 0.517 |
| | Yield | 70% | 72% |
| | Combined Yield | 7.8% | 3.2% |
| | $\phi_i$ | 0.407 (0.118)** | 0.408 |

*The yield of the extraction step for the calculation of combined yield.
**Data in bracket is from the precipitate.

Figures 14A, 14B:
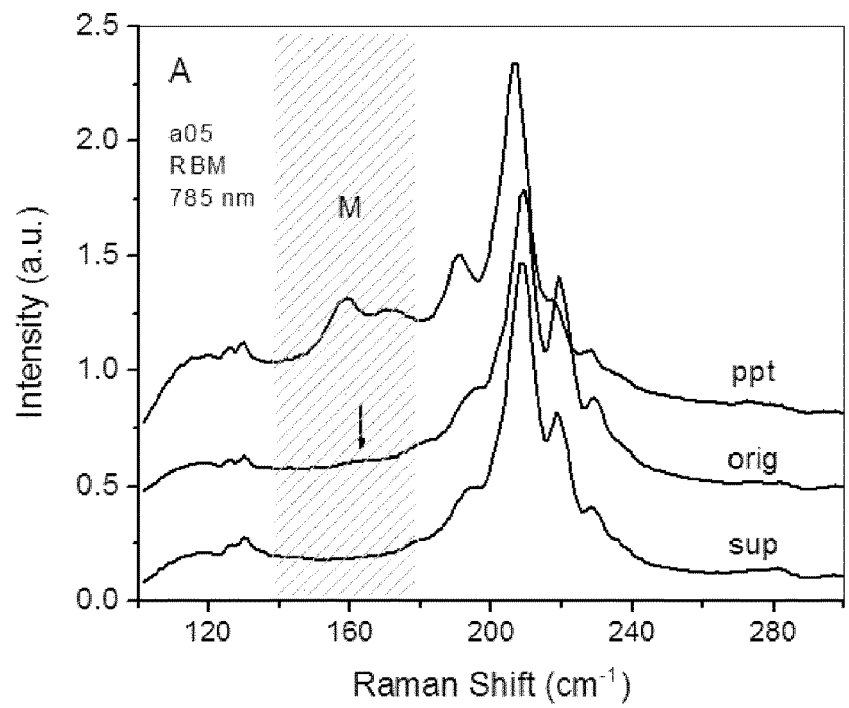
FIG. 14 depicts the RBM band of the Raman spectra excited at 785 nm (FIG. 14A and FIG. 14C) and the G band at 633 nm (FIG. 14B and FIG. 14D) for the two original enriched sc-SWCNT dispersions by polymer extraction (orig) (FIG. 14A and FIG. 14B for Sample a05 and FIG. 14C and FIG. 14D for Sample a40) with different purities at peak ratios of 0.365 and 0.391 and their adsorption purified products from supernatant (sup) and the materials adsorbed on the silica particles in precipitate (ppt) of the silica-CPTES adsorption treatment.
Figure 14C:
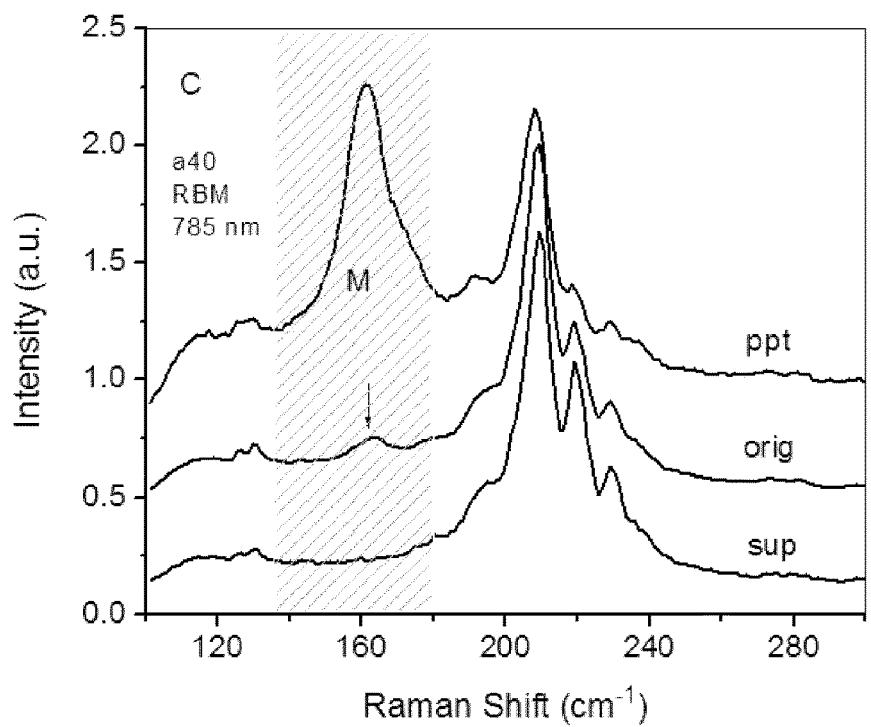
Figure 14D:
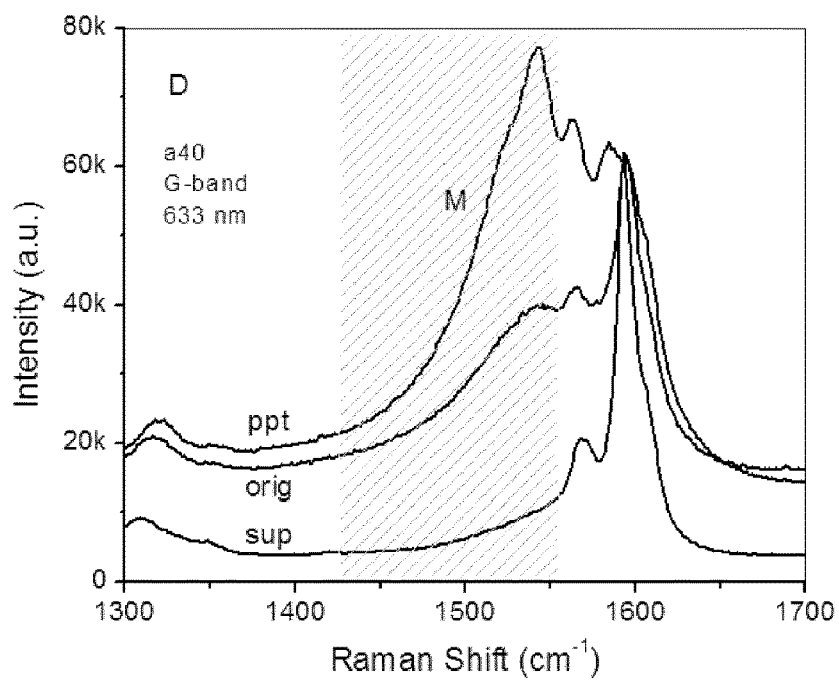

To verify this result, Raman spectra (FIG. 14) of the original enriched sc-SWCNT dispersions (orig), the products from supernatant (sup) and from precipitate (ppt) were collected in the RBM region at 785 nm and the G-band region at 633 nm, where the shaded area represents the metallic region. The Raman spectra show that scattering from m-SWCNTs was completely eliminated in the supernatant while the m-SWCNTs are heavily enriched in the precipitate, confirming that the silica gel can significantly adsorb the m-SWCNTs.

The following conclusion can be reached. The peaks in the RBM region due to m-SWCNTs were completely removed, indicating that silica gel adsorption effectively removes m-SWCNTs from both pure ($\phi_i$=0.391) and less pure ($\phi_i$=0.365) samples. Even for the purer sample from PFDD enrichment, the peak in the RBM region due to m-SWCNTs was still seen in the precipitate material adsorbed on the silica gel indicating that this process is capable of removing m-SWCNTs from highly pure sc-SWCNTs. Significant m-SWCNT enrichment can be seen in the materials on the silica gel indicating great selectivity to m-SWCNTs of the adsorption process. The $\phi_i$ value, the intensity of the peak in the RBM region of the 785 nm spectrum and the peak intensity in the G-band region of the 633 nm spectrum show a good correlation.

EXAMPLE 4

Thin Film Transistor (TFT) Based on Laser sc-SWCNTs Produced by the Hybrid Two-step Process The high sc-purity of $SiO_2$ treated samples of Example 3 was further verified by TFT device tests. TFT devices were fabricated on silicon wafers with a 100 nm thick thermal oxide layer. The chip was first cleaned by Piranha solution for 30 min at 80° C. and then soaked in 0.1% poly-L-lysine (PLL) solution for 5 min. After thoroughly rinsing with distilled water and isopropanol, the chip was blow dried using $N_2$, and then was soaked in a toluene solution of the enriched SWCNTs produced by the present process (concentration of SWCNT is in a range of 20~30 μg/ml, weight ratio of PFDD/SWCNTs is around 4:1 to 7:1) for 10 min, followed by rinsing with 5 mL of toluene) The coated chip was annealed at 200° C. for 1 h before top contacts (5 nm Ti followed by 100 nm Pt) were deposited through a shadow mask using an e-beam evaporator. The active channel width is 100 μm and length is 100 μm, 75 μm, 50 μm or 25 μm. An I-V curve was collected on a probe station and the mobility was calculated from the $I_{sd}$-$V_g$ transfer curve in the linear regime based on a parallel plate model (Bisri 2012).

Figure 15:
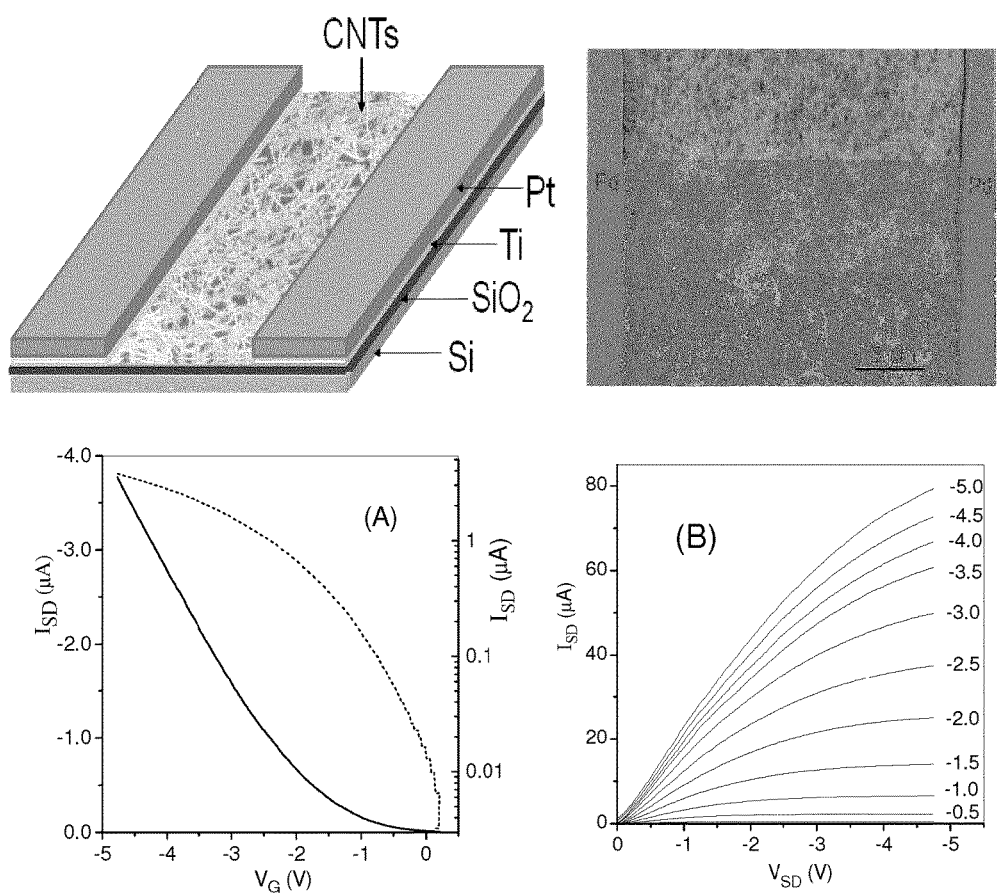
FIG. 15 depicts a diagram of the TFT device structure (top right) and a SEM image of the device (top left) and the output curves (A) and transfer curve (B) of a typical FET device constructed with sc-SWCNTs produced by the present process with a channel length of 25 µm and a width of 100 µm (top contact source/drain electrodes with 5 nm Ti/100 nm Pt). The transfer curve was taken at a source-drain voltage of 0.2 V.

TFT devices prepared from the enriched sc-SWCNT sample (a05-Sol) showed an on/off current ratio of 7.2×10$^5$ and a mobility of 61 cm$^2$/Vs for a device with 25 μm of channel length and 100 μm of channel width. Representative output curves (A) and transfer curve (B) can be seen in FIG. 15. Furthermore, the test of the all 25 devices on a chip showed all the devices had good transistor performance with on/off ratio over 10$^4$ and mobility over 25 cm$^2$/Vs, while only 12 devices out of the 25 from the sample before adsorption treatment (a05-orig) showed a regular TFT character with motilities of 10-30 cm$^2$/Vs and on/off ratios of about 10$^4$, even though the UV measurement only showed a small $\phi_i$ change before and after this treatment (0.391 vs. 0.408). A similar device performance was also obtained from the other sample purified from a lower sc-purity (a40-sup). From the sample before this treatment (a40-orig with a $\phi_i$ value of 0.365), only a mobility of 28 cm$^2$/Vs and on/off ratios of about 3 was obtained from one of the best device. This result confirmed again a high quality of the hybrid purified sc-SWCNTs.

TABLE 5

TFT device performance of two PFDD enriched samples (a40 and a05) with $\phi_i$ value of 0.365, and 0.391 before and after silica gel adsorption treatment.

| Sample | $\phi_i$ | Mobility (cm$^2$/Vs) | on/off |
|---|---|---|---|
| A40-orig | 0.365 | 28 | 3 |
| A05-orig | 0.391 | 22 | 1 × 10$^4$ |
| A40-sup | 0.407 | 40 | 6.2 × 10$^5$ |
| A05-sup | 0.408 | 61 | 7.2 × 10$^5$ |

References: The contents of the entirety of each of which are incorporated by this reference.

Berton N, et al. (2011) Copolymer-Controlled Diameter-Selective Dispersion of Semiconducting Single-Walled Carbon Nanotubes. *Chem. Mater.* 23, 2237-2249.

Bisri S Z, Ga J, Derenskyi V, Gomulya W, Iezhokin I, Gordiichuk P, Herrmann A, Loi A M. (2012) *Adv. Mater.* 24, 6147-6152.

Ding J, Day M, Robertson G, Roovers J. (2002) Synthesis and Characterization of Alternating Copolymers of Fluorene and Oxadiazole. *Macromolecules.* 35(9), 3474-3483.

Doorn S K, O'Connell M J, Densmore C G, Wang H-I. (2010) Chirality-Based Separation of Carbon Nanotubes. United States Patent Publication 2010-0111814 published May 6, 2010.

Gao J, et al. (2012) Tuning the physical parameters towards optimal polymer-wrapped single-walled carbon nanotubes dispersions. *Eur. Phys. J. B.* 85: 246.

Gao J, et al. (2011) Effectiveness of sorting single-walled carbon nanotubes by diameter using polyfluorene derivatives. *Carbon.* 49(1), 333-338.

Gomulya W, et al. (2013) Semiconducting Single-Walled Carbon Nanotubes on Demand by Polymer Wrapping. Adv. Mater. DOI: 10. 1002/adma.201300267.

Hwang J-Y, et al. (2008) Polymer Structure and Solvent Effects on the Selective Dispersion of Single-Walled Carbon Nanotubes. JACS. 130, 3543-3553.

Itkis M E, Perea D E, Niyogi S, Rickard S M, Hamon M A, Hu H, Zhao B, Haddon R C. (2003) Purity Evaluation of As-Prepared Single-Walled Carbon Nanotube Soot by Use of Solution-Phase Near-IR Spectroscopy. *Nano Lett.* 3, 309-314.

Kajiura H, Li Y, Li X, Liu Y, Cao L, Fu L, Wei D, Wang Y, Zhu D. (2012) Method for Treating Carbon Nanotubes, Carbon Nanotubes and Carbon Nanotubes Device Comprising Thereof. U.S. Pat. No. 8,231,854 issued Jul. 31, 2012.

Kokin K. (2007) Method for Separation of Metallic Carbon Nanotube, Method for Producing Thin Film of Semiconducting Carbon Nanotube, Thin-Film Transistor and its Production Method, Electronic Element, and Method of Producing the Element. Japanese Patent Publication 2007-031238 published Feb. 8, 2007.

Lemasson F, et al. (2012) Polymer Library Comprising Fluorene and Carbazole Homo- and Copolymers for Selective Single-Walled Carbon Nanotubes Extraction. *Macromolecules.* 45, 713-722.

Liu H, Tanaka T, Kataura H. (2013) Method for Separating and Collecting Carbon Nanotube, and Carbon Nanotube. United States Patent Publication 2013-0052120 published Feb. 28, 2013.

Malenfant P R L, Lee J-U, Li Y, Cicha W V. (2007) High Performance Field Effect Transistors Comprising Carbon Nanotubes Fabricated Using Solution Based Processing. U.S. Pat. No. 7,226,818 issued Jun. 5, 2007.

Mistry K S, Larsen B A, Blackburn J L. (2013) High Yield Dispersions of Large-Diameter Semiconducting Single-Walled Carbon Nanotubes with Tunable Narrow Chirality Distributions. *ACSnano.* DOI: 10. 1021/nn305336x.

Naumov A V, Ghosh S, Tsyboulski D A, Bachilo S M, Weisman R B. (2011) Analyzing Absorption Backgrounds in Single-Walled Carbon Nanotube Spectra. *ACSNano.* 5, 1639-1648.

Ozawa H, et al. (2011) Rational Concept To Recognize/Extract Single-Walled Carbon Nanotubes with a Specific Chirality. *JACS.* 133, 2651-2657.

Park Y-j, Kim J-m, Lee H-W, Bao Z. (2012) Method of Selective Separation of Semiconducting Carbon Nanotubes, Dispersion of Semiconducting Carbon Nanotubes, and Electronic Device Including Carbon Nanotubes Separated by Using the Method. United States Patent Publication 2012-0104328 published May 3, 2012.

Sun Y-P. (2008) Process for Separating Metallic from Semiconducting Single-Walled Carbon Nanotubes. U.S. Pat. No. 7,374,685 issued May 20, 2008.

Takeshi T, Hiromichi K. (2012) Low-cost Method for Separating Carbon Nanotubes, Separation Material, and Separation Vessel. International Patent Publication WO 2012-017822 published Feb. 9, 2012.

Tanaka T, Kataura H, Liu H. (2011) Method of More Simple Separation and Collection of Carbon Nanotubes. United States Patent Publication 2011-0280791 published Nov. 17, 2011.

Tanaka T, Kataura H. (2010) Method for Simply Separating Carbon Nanotube. United States Patent Publication 2010-0278714 published Nov. 4, 2010.

Tange M, et al. (2011) Selective Extraction of Large-Diameter Single-Wall Carbon Nanotubes with Specific Chiral Indices by Poly(9,9-dioctylfluorene-alt-benzothiadiazole). *JACS.* 133, 11908-11911.

Tulevski G S, Afzali-Ardakani A, Sanders D P. (2009) Method for the Purification of Semiconducting Single Walled Carbon Nanotubes. U.S. Pat. No. 7,514,063 issued Apr. 7, 2009.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A process for selectively separating semiconducting single-walled carbon nanotubes (sc-SWCNTs) from metallic single-walled carbon nanotubes (m-SWCNTs), comprising: extracting a mixture of sc-SWCNTs and m-SWCNTs with a conjugated polymer to produce an enriched sc-SWCNT dispersion; and, exposing the enriched sc-SWCNT dispersion to an inorganic adsorptive medium in a non-polar solvent, the inorganic adsorptive medium selectively binding the m-SWCNTs to further separate the sc-SWCNTs from the m-SWCNTs.

2. The process according to claim 1, wherein the mixture of sc-SWCNTs and m-SWCNTs comprise SWCNTs with an average diameter in a range of about 0.6 nm to about 2.2 nm.

3. The process according to claim 1, wherein the mixture of sc-SWCNTs and m-SWCNTs is extracted with the conjugated polymer in a polymer:SWCNT mass ratio of from about 0.5:1 to about 10.0:1.

4. The process according to claim 1, wherein the conjugated polymer comprises a polyfluorene or a polythiophene.

5. The process according to claim 1, wherein the conjugated polymer comprises a 9,9-dialkyl-substituted polyfluorene or a 3-alkyl-substituted polythiophene.

6. The process according to claim 1, wherein the conjugated polymer comprises a 9,9-diC$_{10-36}$-alkyl-substituted polyfluorene.

7. The process according to claim 1, wherein the conjugated polymer comprises a 9,9-diC$_{10-18}$-alkyl-substituted polyfluorene or a 3-C$_{10-18}$-alkyl-substituted polythiophene.

8. The process according to claim 1, wherein the conjugated polymer comprises: a copolymer of 9,9-diC$_{10-18}$-alkyl-substituted fluorene with one or more first co-monomer units, the first co-monomer units comprising one or more of thiophene, bithiophene, phenylene, bipyridine, carbazole, anthracene, naphthalene or benzothiadiazole; or a copolymer of 3-$C_{10-18}$-alkyl-substituted thiophene with one or more second co-monomer units, the second co-monomer units comprising one or more of fluorene, bithiophene, phenylene, bipyridine, carbazole, anthracene, naphthalene or benzothiadiazole.

9. The process according to claim 1, wherein the conjugated polymer has a number average molecular weight greater than about 10,000 Da.

10. The process according to claim 1, wherein the conjugated polymer has a number average molecular weight from 10,000 Da to 30,000 Da.

11. The process according to claim 1, wherein the inorganic adsorptive medium comprises an inorganic oxide stable in the non-polar solvent.

12. The process according to claim 1, wherein the inorganic adsorptive medium comprises silica, alumina, titania, a zeolite, a diatomaceous earth or mixtures thereof.

13. The process according to claim 1, wherein the inorganic adsorptive medium is functionalized to assist with specificity of interaction toward m-SWCNTs over sc-SWCNTs.

14. The process according to claim 13, wherein the inorganic adsorptive medium is functionalized with a cyano, amino, hydroxyl, mercapto, halo, alkyl or aromatic group or mixtures thereof.

15. The process according to claim 1, wherein the enriched sc-SWCNT dispersion is exposed to the inorganic adsorptive medium in a mass ratio of inorganic adsorptive medium to SWCNT ratio of about 50:1 to 500:1.

16. The process according to claim 1, wherein the non-polar solvent comprises an aromatic organic solvent.

17. The process according to claim 1, wherein the non-polar solvent comprises toluene, benzene, ethyl benzene, xylenes, 1-methylnaphthalene or mixtures thereof.

18. The process according to claim 1, wherein the extraction is performed in a solvent and the solvent for the extraction is the same as the non-polar solvent.

19. The process according to claim 18, wherein the mixture of sc-SWCNTs and m-SWCNTs is dispersed in the extraction solvent at a concentration of from about 0.1 mg/mL to about 10.0 mg/mL.

20. The process according to claim 1, wherein the sc-SWCNTs separated from the m-SWCNTs by the inorganic adsorptive medium are recovered by centrifugation or filtration.

* * * * *